(12) United States Patent
Kim et al.

(10) Patent No.: US 12,455,102 B2
(45) Date of Patent: Oct. 28, 2025

(54) REFRIGERATOR AND CONTROLLING METHOD THEREOF

(71) Applicant: SAMSUNG ELECTRONICS CO., LTD., Suwon-si (KR)

(72) Inventors: Dohyung Kim, Suwon-si (KR); Yanggyu Kim, Suwon-si (KR); Kookjeong Seo, Suwon-si (KR); Jaeho Song, Suwon-si (KR); Sangbeom Ahn, Suwon-si (KR); Kuneui Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 188 days.

(21) Appl. No.: 18/220,579

(22) Filed: Jul. 11, 2023

(65) Prior Publication Data

US 2023/0349611 A1 Nov. 2, 2023

Related U.S. Application Data

(63) Continuation of application No. PCT/KR2022/001396, filed on Jan. 26, 2022.

(30) Foreign Application Priority Data

Mar. 23, 2021 (KR) .................. 10-2021-0037447

(51) Int. Cl.
*F25D 29/00* (2006.01)
*F25B 41/20* (2021.01)
(Continued)

(52) U.S. Cl.
CPC ............ *F25B 49/022* (2013.01); *F25B 41/20* (2021.01); *F25D 11/022* (2013.01);
(Continued)

(58) Field of Classification Search
CPC ...... F25D 11/022; F25D 17/065; F25D 17/08; F25D 29/00; F25D 29/005; F25D 2700/12
See application file for complete search history.

(56) References Cited

U.S. PATENT DOCUMENTS 4,485,633 A * 12/1984 King ..................... G07F 9/105
62/203
5,546,759 A 8/1996 Lee
(Continued)

FOREIGN PATENT DOCUMENTS

JP 10-267504 A 10/1998
JP 2001-099543 A 4/2001
(Continued)

OTHER PUBLICATIONS

Communication dated May 21, 2024, issued by the European Patent Office in counterpart European Application No. 22775889.3.
(Continued)

*Primary Examiner* — Jonathan Bradford
(74) *Attorney, Agent, or Firm* — Sughrue Mion, PLLC

(57) ABSTRACT

A refrigerator includes: a storage chamber configured to be maintained at a temperature above zero degrees Celsius; an evaporator disposed in a duct that is fluidly connected to the storage chamber; a compressor; a valve disposed in a flow path which connects the compressor to the evaporator; a first fan configured to drive air that is cooled by the evaporator to the storage chamber; and a controller. The controller is configured to: control at least one of the compressor or the valve to supply a refrigerant to the evaporator based on the temperature of the storage chamber, and delay operation of the first fan for a preset first reference period of time after the at least one of the compressor or the valve began supplying the refrigerant to the evaporator.

17 Claims, 17 Drawing Sheets

(51) Int. Cl.
*F25B 49/02* (2006.01)
*F25D 11/02* (2006.01)
*F25D 17/06* (2006.01)
*F25D 17/08* (2006.01)

(52) U.S. Cl.
CPC ........... *F25D 17/065* (2013.01); *F25D 17/08* (2013.01); *F25D 29/005* (2013.01); *F25B 2600/112* (2013.01); *F25B 2600/2511* (2013.01); *F25B 2700/21* (2013.01); *F25D 29/00* (2013.01); *F25D 2700/12* (2013.01)

(56) References Cited

U.S. PATENT DOCUMENTS

| | | | |
|---|---|---|---|
| 5,918,474 | A | 7/1999 | Khanpara et al. |
| 6,058,723 | A | 5/2000 | Kusunoki et al. |
| 6,327,867 | B1* | 12/2001 | Hyodo ................ F25B 5/04 62/187 |
| 6,622,498 | B2 | 9/2003 | Park et al. |
| 7,448,226 | B2 | 11/2008 | Yamashita et al. |
| 10,254,036 | B2* | 4/2019 | Lim ................ F25D 17/065 |
| 10,429,118 | B2 | 10/2019 | Ko et al. |
| 2003/0182952 | A1* | 10/2003 | Brooke ............ F25B 49/025 62/228.4 |
| 2011/0302938 | A1* | 12/2011 | Lee ................ F25D 17/065 62/89 |
| 2020/0263916 | A1 | 8/2020 | Nakajima et al. |

FOREIGN PATENT DOCUMENTS

| | | |
|---|---|---|
| JP | 2003-287333 A | 10/2003 |
| JP | 2019-117036 A | 7/2019 |
| KR | 20-0117183 Y1 | 2/1998 |
| KR | 10-0222929 B1 | 3/2000 |
| KR | 10-2002-0085372 A | 11/2002 |
| KR | 10-0451351 B1 | 10/2004 |
| KR | 10-0519065 B1 | 11/2005 |
| KR | 10-2012-0010527 A | 2/2012 |
| KR | 10-1330936 B1 | 3/2013 |
| KR | 10-2013-0136200 A | 12/2013 |
| KR | 10-2016-0023105 A | 3/2016 |
| KR | 10-2016-0065593 A | 6/2016 |

OTHER PUBLICATIONS

Written Opinion (PCT/ISA/237) issued May 16, 2022 from the International Searching Authority in International Application No. PCT/KR2022/001396.

International Search Report (PCT/ISA/210) issued May 16, 2022 from the International Searching Authority in International Application No. PCT/KR2022/001396.

* cited by examiner

REFRIGERATOR AND CONTROLLING METHOD THEREOF

CROSS REFERENCE TO RELATED APPLICATIONS

This application is a continuation of PCT/KR2022/001396, designating the United States, filed Jan. 26, 2022, in the Korean Intellectual Property Receiving Office, which claims priority to Korean Patent Application No. 10-2021-0037447, filed on Mar. 23, 2021, in the Korean Intellectual Property Office. The disclosures of each of these applications are incorporated herein in their entireties.

TECHNICAL FIELD

The disclosure relates to a refrigerator and a method for controlling the same, and more particularly, to a refrigerator including that is partitioned into multiple sections and a method for controlling the refrigerator.

BACKGROUND

A traditional refrigerator commonly uses a refrigerant cycle including compression, condensation, expansion, and evaporation to cool air in a storage chamber. The traditional refrigerator keeps various food items fresh for a long time by supplying air cooled around an evaporator, which evaporates the refrigerant, to the storage chamber. The storage chamber of the refrigerator may be divided into a fridge that is maintained at about positive 3 degrees Celsius to keep food refrigerated and a freezer that is maintained at about negative 20 degrees Celsius to keep food frozen.

In order to store different types of food (e.g., vegetables, meat, fish) at different temperatures, the refrigerator may be partitioned into multiple sections (e.g., a fridge section, a fresh room, or a pantry room).

The traditional refrigerator merely suppresses air blending between the multiple sections without actively maintaining differences in temperature between the multiple sections.

Hence, the multiple sections do not actively maintain the temperature distinction in the traditional refrigerator.

SUMMARY

The disclosed embodiments provide a refrigerator that is capable of constantly maintaining the temperature distinction between multiple sections included in the refrigerator, and method for controlling the same.

A refrigerator may include: a storage chamber configured to be maintained at a temperature above zero degrees Celsius; an evaporator disposed in a duct that is fluidly connected to the storage chamber; a compressor; a valve disposed in a flow path which connects the compressor to the evaporator; a first fan configured to drive air that is cooled by the evaporator to the storage chamber; and a controller. The controller may be configured to: control at least one of the compressor or the valve to supply a refrigerant to the evaporator based on the temperature of the storage chamber, and delay operation of the first fan for a preset first reference period of time after the at least one of the compressor or the valve began supplying the refrigerant to the evaporator.

The controller may be further configured to drive the first fan based on the preset first reference period of time having elapsed since the at least one of the compressor or the valve began supplying the refrigerant to the evaporator.

The controller may be further configured to control the at least one of the compressor or the valve to stop supplying the refrigerant to the evaporator based on the temperature of the storage chamber, and stop the first fan based on the at least one of the compressor or the valve stopping of supplying the refrigerant to the evaporator.

The controller may be further configured to rotate the first fan without supplying the refrigerant to the evaporator based on a preset second reference period of time having elapsed after the at least one of the compressor or the valve stopping of supplying the refrigerant to the evaporator.

The controller may be further configured to operate the compressor with the valve closed for a preset third reference period of time, and open the valve based on the third reference period of time having elapsed since the operation of the compressor began.

The controller may be further configured to operate the compressor at a first speed for the preset first reference period of time, and operate the compressor at a second speed based on the preset first reference period of time having elapsed since the operation of the compressor at the first speed began, the second speed being lower than the first speed.

The refrigerator may further include: a panel separating the storage chamber and the duct. The storage chamber may include a main room and an isolated room. The panel may have a first opening connecting the duct to the main room and a second opening connecting the duct to the isolated room.

The second opening may be disposed at a position corresponding to a bottom portion of the evaporator. The second opening may be spaced apart from a vertical center line of the panel.

A center line of the bottom portion of the evaporator may be spaced apart from the vertical center line of the evaporator toward the second opening.

The refrigerant may be configured to flow in through a top end of the evaporator and flow out through a bottom end of the evaporator.

The refrigerator may further include: a second fan configured to drive the air that is cooled by the evaporator into the isolated room.

The controller may be further configured to drive the second fan after the preset first reference period of time having elapsed since the at least one of the compressor or the valve began supplying the refrigerant to the evaporator.

The controller may be further configured to control the at least one of the compressor or the valve to stop supplying the refrigerant to the evaporator based on the temperature of the storage chamber, stop the first fan based on the at least one of the compressor or the valve stopping of supplying the refrigerant to the evaporator, and stop the second fan based on a preset second reference period of time after the at least one of the compressor or the valve stopping of supplying the refrigerant to the evaporator.

A method of controlling a refrigerator may include: controlling at least one of a compressor or a valve to supply a refrigerant to an evaporator that is disposed in a duct that is fluidly connected to a storage chamber that is maintained at temperature above zero degrees Celsius based on a temperature of the storage chamber, the compressor being disposed in a flow path which connects the compressor to the evaporator; and delaying operation of a fan that is configured to supply air that is cooled by the evaporator to the storage chamber for a preset first period of time since the at least one of the compressor or the valve began supplying the refrigerant to the evaporator.

The method may further include: driving the fan based on the first reference period of time having elapsed since the at least one of the compressor or the valve began supplying the refrigerant to the evaporator.

A panel may separate the storage chamber and the duct. The storage chamber may include a main room and an isolated room. The panel may have a first opening connecting the duct to the main room and a second opening connecting the duct to the isolated room.

The first fan may be configured to drive the air that is cooled by the evaporator to the main room. A second fan may be configured to drive the air that is cooled by the evaporator into the isolated room.

The method may further include: driving the second fan after the preset first reference period of time has elapsed since the at least one of the compressor or the valve began supplying the refrigerant to the evaporator.

The method may further include: controlling the at least one of the compressor or the valve to stop supplying the refrigerant to the evaporator based on the temperature of the storage chamber, stopping the first fan based on the at least one of the compressor or the valve stopping of supplying the refrigerant to the evaporator, and stopping the second fan based on a preset second reference period of time after the at least one of the compressor or the valve stopping of supplying the refrigerant to the evaporator.

A non-transitory storage medium may store instructions of a method to be carried out by a controller of a refrigerator. The method may include controlling at least one of a compressor or a valve to supply a refrigerant to an evaporator that is disposed in a duct that is fluidly connected to a storage chamber that is maintained at temperature above zero degrees Celsius based on a temperature of the storage chamber, the compressor being disposed in a flow path which connects the compressor to the evaporator; and delaying operation of a fan that is configured to supply air that is cooled by the evaporator to the storage chamber for a preset first period of time since the at least one of the compressor or the valve began supplying the refrigerant to the evaporator.

Accordingly, a refrigerator that is capable of constantly maintaining temperature differences between multiple sections included in the refrigerator, and method for controlling the same, may be provided.

DETAILED DESCRIPTION

Figure 1:
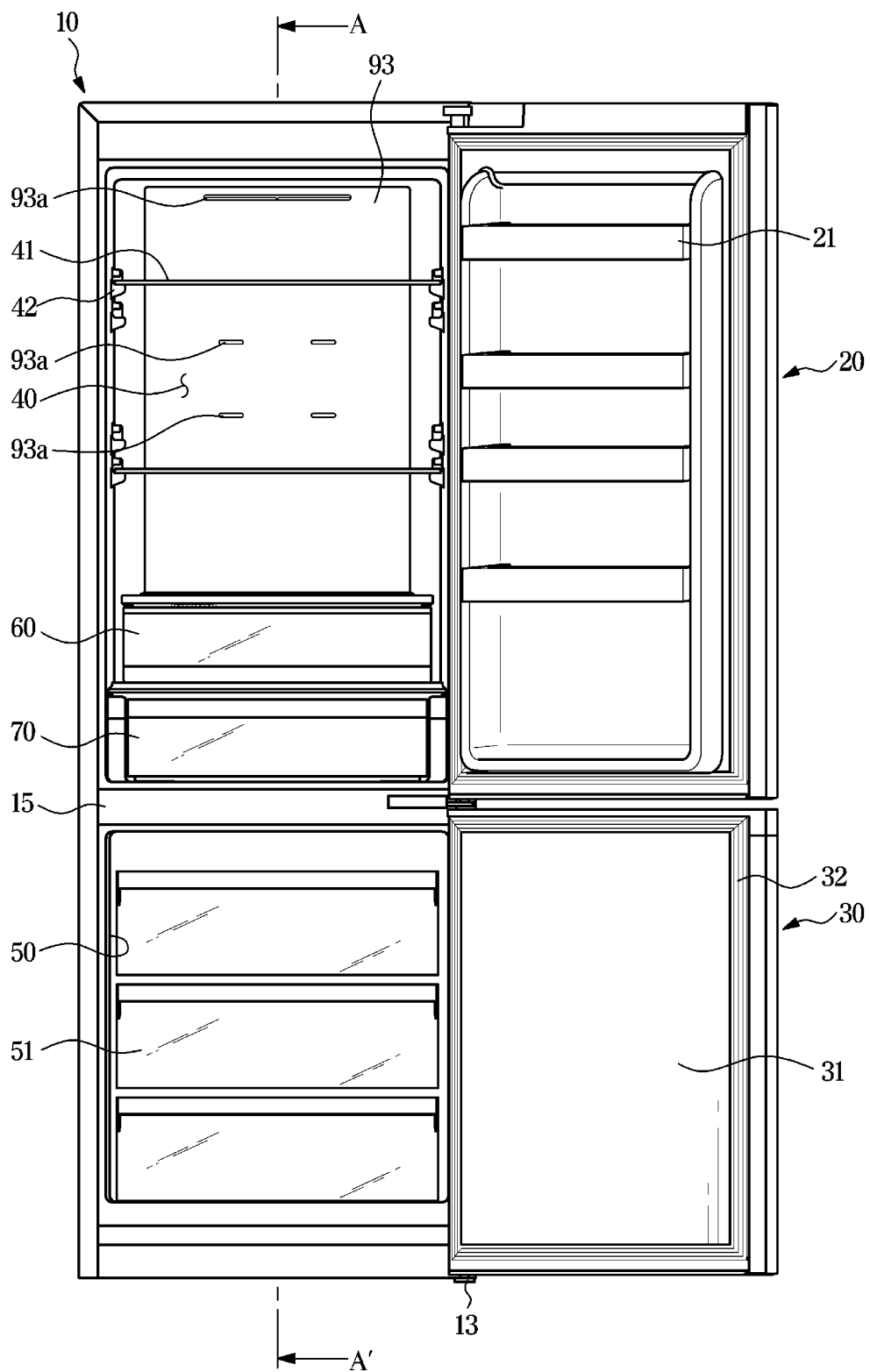
FIG. 1 illustrates an example of a refrigerator, according to an embodiment.

Like numerals refer to like elements throughout the specification. Not all elements of disclosed embodiments will be described, and description of what are commonly known in the art or what overlap each other in the embodiments will be omitted. The terms as used throughout the specification, such as "— part", "— module", "— member", "— block", etc., may be implemented in software and/or hardware, and a plurality of "— parts", "— modules", "— members", or "— blocks" may be implemented in a single element, or a single "— part", "— module", "— member", or "— block" may include a plurality of elements.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

Throughout the specification, when it is said that a member is located "on" another member, it implies not only that the member is located adjacent to the other member but also that a third member exists between the two members.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are just used for convenience of explanation, but not to limit an order of the steps. Thus, unless the context clearly dictates otherwise, the written order may be practiced otherwise.

The principle and embodiments will now be described with reference to accompanying drawings.

Figure 2:
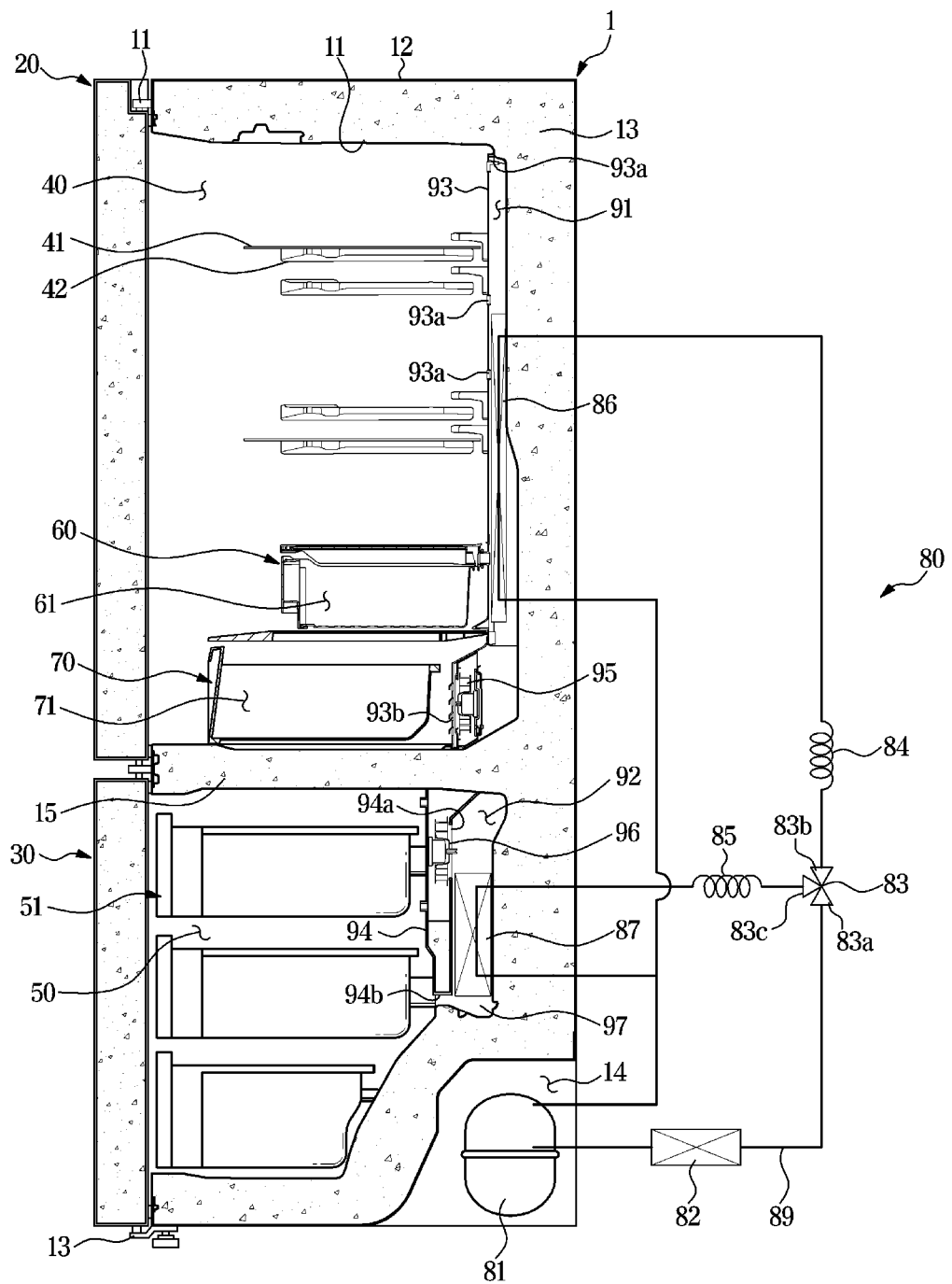
FIG. 2 illustrates a cross-section of the refrigerator along direction A-A' and a refrigerant cycle, according to an embodiment.

FIG. 1 illustrates an example of a refrigerator, according to an embodiment. FIG. 2 illustrates a cross-section of the refrigerator along direction A-A' and a refrigerant cycle, according to an embodiment.

As shown in FIGS. 1 and 2, a refrigerator 1 may include a main body 10 with open front, storage chambers 40 and 50 formed in the main body 10 for keeping foods refrigerated and/or frozen, doors 20 and 30 for opening or closing the open front of the main body 10, and a cooling device 80 for cooling the storage chambers 40 and 50.

The main body 10 may define outer appearance of the refrigerator 1. The main body 10 may include an inner casing 11 to form the storage chambers 40 and 50, and an outer casing 12 coupled to outer sides of the inner casing 11. Insulation 13 may be filled between the inner casing 11 and the outer casing 12 of the main body 10 to prevent cool air from leaking out of the storage chambers 40 and 50.

The storage chambers 40 and 50 may include a first storage chamber 40 and a second storage chamber 50 vertically separated by a horizontal partition wall 15. For example, the first storage chamber 40 may refrigerate foods at temperature above zero Celsius. Internal temperature of the first storage chamber 40 may be maintained between about positive 1 degree Celsius and about positive 5 degrees Celsius. The second storage chamber 50 may refrigerate foods at temperature below zero Celsius. Internal temperature of the second storage chamber 50 may be maintained between about negative 18 degrees Celsius and negative 20 degrees Celsius.

The storage chambers 40 and 50 may be opened or closed by the doors 20 and 30. For example, the first storage chamber 40 may be opened or closed by the first door 20. The second storage chamber 50 may be opened or closed by the second door 30.

Shelves 41 and shelf supporters 42 for slidably supporting the shelves 41 may be arranged in the first storage chamber 40. The number of shelves 41 and the shelf supporters 42 may vary depending on the design specification.

A first container 60 and a second container 70 may be provided in the first storage chamber 40.

The first container 60 may form a first isolated room 61 substantially separated from the first storage chamber 40. Internal temperature of the first container 60 may be different from the temperature of the first storage chamber 40. The internal temperature of the first container 60 may be lower than the temperature of the first storage chamber 40 and higher than the temperature of the second storage chamber 50. For example, the internal temperature of the first container 60 may be maintained between negative 1 degree Celsius and positive 1 degree Celsius.

The second container 70 may form a second isolated room 71 substantially separated from the first storage chamber 40. Internal temperature of the second container 70 may be different from the temperature of the first storage chamber 40. The internal temperature of the second container 70 may be higher than the temperature of the first storage chamber 40. For example, the internal temperature of the second container 70 may be maintained at positive 5 degrees Celsius or higher.

A first rear panel 93 may be arranged behind the first storage chamber 40 to separate the first storage chamber 40 from a first cooling duct 91 in which the cooling device 80 is arranged. A first outlet 93a may be formed at the first rear panel 93 to discharge the air cooled by the cooling device 80 into the first storage chamber 40. Furthermore, an auxiliary outlet 93c may be formed at the first rear panel 93 to discharge the air cooled by the cooling device 80 into the first container 60

A plurality of freezing container 51 may be arranged in the second storage chamber 50. As internal temperature of the second storage chamber 50 is set to be lower than the internal temperature of the first storage chamber 40, a difference in temperature between the second storage chamber 50 and the outside is larger than a difference in temperature between the first storage chamber 40 and the outside. Hence, a change in temperature of the second storage chamber 50 caused by opening of the door is bigger than a change in temperature of the first storage chamber 40. A plurality of freezing containers 51 may be provided in the second storage chamber 50 to reduce the change in temperature in the second storage chamber 50 when the second door 30 is opened.

A second rear panel 94 may be arranged behind the second storage chamber 50 to separate the second storage chamber 50 from a second cooling duct 92 in which the cooling device 80 is arranged. A second outlet 94a may be formed at the second rear panel 94 to discharge the air cooled by the cooling device 80 into the second storage chamber 50.

The doors 20 and 30 may include respective gaskets 22 and 32, and the gaskets 22 and 32 may seal gaps between the storage chambers 40 and 50 and the doors 20 and 30 to prevent or suppress leakage of the cooled air.

A door guard 21 may be arranged on the rear surface of the first door 20. The door guard 21 may receive food items. A plurality of door guards 21 may be arranged.

A metal plate 31 may be arranged on the rear surface of the second door 30. The metal plate 31 may be cooled by the cooled air of the second storage chamber 50 while the second door 30 is closed. The metal plate 31 may still remain in the cooled state when the second door 30 is opened. The metal plate 31 may prevent or suppress a sharp increase in internal temperature of the second storage chamber 50 due to warm outside air when the second door 30 is closed after being opened. In other words, the metal plate 31 may reduce or suppress a change in temperature of the second storage chamber 50 due to opening and closing of the second door 30.

The cooling device 80 may include, as shown in FIG. 2, a compressor 81 for compressing the refrigerant at high pressure, a condenser 82 for condensing the compressed refrigerant, expanders 84 and 85 for expanding the refrigerant at low pressure, evaporators 57 and 58 for evaporating the refrigerant, and a refrigerant tube 89 for guiding the refrigerant.

The compressor 81 and the condenser 82 may be arranged in a machine room 14 provided in a bottom rear portion of the main body 10.

The compressor 81 may compress a gaseous refrigerant at high pressure, and the compressed refrigerant may be conveyed to the condenser 82 through the refrigerant tube 89. In the condenser 82, the high-pressure refrigerant may be condensed and the gaseous refrigerant may be changed into a liquid state.

The refrigerant in the liquid state may pass a switching valve 83 arranged in the refrigerant tube 89 and may be conveyed to the expanders 84 and 85. The expanders 84 and 85 may include the first expander 84 and a second expander 85 and the first expander 84 may be connected to the first evaporator 86 and the second expander 85 may be connected to the second evaporator 87. The expanders 84 and 85 may include capillary tubes, and the refrigerant in the liquid state may be decompressed into low pressure.

The refrigerant in the liquid state decompressed by the first expander 84 may be conveyed to the first evaporator 86 and evaporated in the first evaporator 86. While being evaporated in the first evaporator 86, the refrigerant may absorb heat from surrounding air, and the surrounding air of the first evaporator 86 may be cooled due to the heat absorption of the first evaporator 86.

The first evaporator 86 may be arranged in the first cooling duct 91 to cool surrounding air. The first evaporator 86 arranged in the first cooling duct 91 may cool air in the first cooling duct 91, and the cooled air may be supplied into the first storage chamber 40.

As shown in FIG. 2, the first cooling duct 91 separated by the first rear panel 93 from the first storage chamber 40 may be arranged behind the first storage chamber 40. A first suction port 93b may be arranged at the first rear panel 93, and a first fan 95 may be arranged in the first suction port 93b. The first fan 95 may suck the air of the first storage chamber 40 into the first cooling duct 91 through the first suction port 93b. As the air of the first storage chamber 40 is sucked by the first fan 95 into the first cooling duct 91, the air in the first cooling duct 91 may be discharged into the first storage chamber 40 and the first container 60 through the first outlet 93a and the auxiliary outlet 93c, respectively.

As such, the air of the first storage chamber 40 may be sucked into the first cooling duct 91 through the first suction port 93b according to the operation of the first fan 95. Furthermore, the air cooled by the first evaporator 86 in the first cooling duct 91 may be discharged into the first storage chamber 40 and the first container 60 through the first outlet 93a and the auxiliary outlet 93c, respectively, according to the operation of the first fan 95.

The first suction port 93b and the first outlet 93a may each be arranged nearly at one end of the first cooling duct 91. For example, as shown in FIG. 2, the first suction port 93b and the first fan 95 may be arranged at the bottom end of the first cooling duct 91, and the first outlet 93a may be arranged at the top end of the first cooling duct 91. The auxiliary outlet 93c may be arranged in a position corresponding to the first container 60.

The refrigerant in the liquid state decompressed by the first expander 85 may be conveyed to the second evaporator 87 and evaporated in the second evaporator 87. While being evaporated in the second evaporator 87, the refrigerant may absorb heat from surrounding air, and the surrounding air of the second evaporator 87 may be cooled due to the heat absorption of the second evaporator 87.

The second evaporator 87 may be arranged in the second cooling duct 92 to cool the surrounding air. The second evaporator 87 arranged in the second cooling duct 92 may cool the air in the second cooling duct 92, and the cooled air may be supplied into the second storage chamber 50.

As shown in FIG. 2, the second cooling duct 92 may be arranged behind the second storage chamber 50. A second outlet 94a may be arranged in the second cooling duct 92, and a second fan 96 may be arranged in the second outlet 94a. The second fan 96 may discharge the air cooled by the second evaporator 87 in the second cooling duct 92 into the second storage chamber 50 through the second outlet 94a. As the air of the second cooling duct 92 is discharged by the second fan 96 into the second storage chamber 50, the air of the second storage chamber 50 may be sucked into the second cooling duct 92 through a second suction port 94b.

The second suction port 94b and the second outlet 94a may each be arranged substantially at one end of the second cooling duct 92. For example, as shown in FIG. 2, the second suction port 94b may be arranged at the bottom end of the second cooling duct 92, and the second outlet 94a and the second fan 96 may be arranged at the top end of the second cooling duct 92.

The switching valve 83 may be arranged in the refrigerant tube 89 to distribute the refrigerant to the first evaporator 86 and/or the second evaporator 87.

According to the operation of the switching valve 83, the refrigerant may be conveyed to the first evaporator 86 or the second evaporator 87.

For example, the switching valve 83 may be a three-way valve including an inlet 83a, a first outlet 83b and a second outlet 83c. The inlet 83a may be connected to the condenser 82, the first outlet 83b may be connected to the first evaporator 86 through the first expander 84, and the third outlet 83c may be connected to the second evaporator 87 through the second expander 85. When the first outlet 83b is opened according to an operation of the switching valve 83, the refrigerant in the liquid state may be supplied to the first evaporator 86 through the first expander 84. When the second outlet 83c is opened according to an operation of the switching valve 83, the refrigerant in the liquid state may be supplied to the second evaporator 87 through the second expander 85.

A defrosting heater 97 may be arranged around the second evaporator 87. The defrosting heater 97 may radiate heat to defrost the second evaporator 87.

Water vapor may be deposited on the surface of the evaporators 86 and 87 or congealed water vapor may be frozen due to the cooling of the surrounding air. This may cause the surfaces of the evaporators 86 and 87 to be covered with frost.

The internal temperature of the first storage chamber 40 cooled by the first evaporator 86 may be maintained at 0 degree Celsius or higher. Hence, the first evaporator 86 may be defrosted by circulating the air of the first storage chamber 40.

On the other hand, the internal temperature of the second storage chamber 50 cooled by the second evaporator 87 may be maintained at lower than 0 degree Celsius. Hence, only circulation of the air of the second storage chamber 50 may hardly defrost the second evaporator 87. Accordingly, the defrosting heater 97 for providing heat to defrost the second evaporator 87 may be provided.

Figure 3:
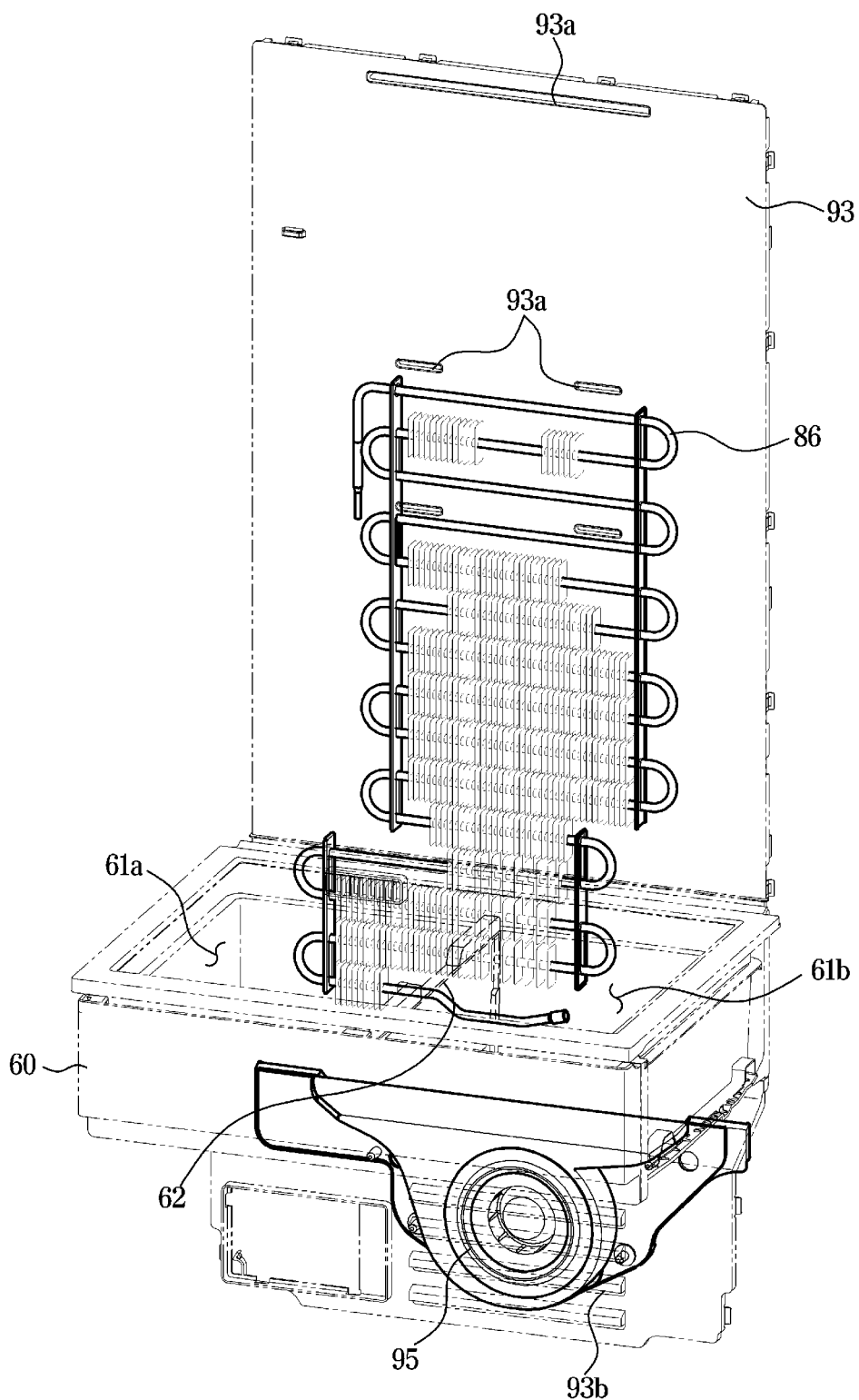
FIG. 3 illustrates a first rear panel, a first evaporator and a first container included in a refrigerator, according to an embodiment.
Figure 4:
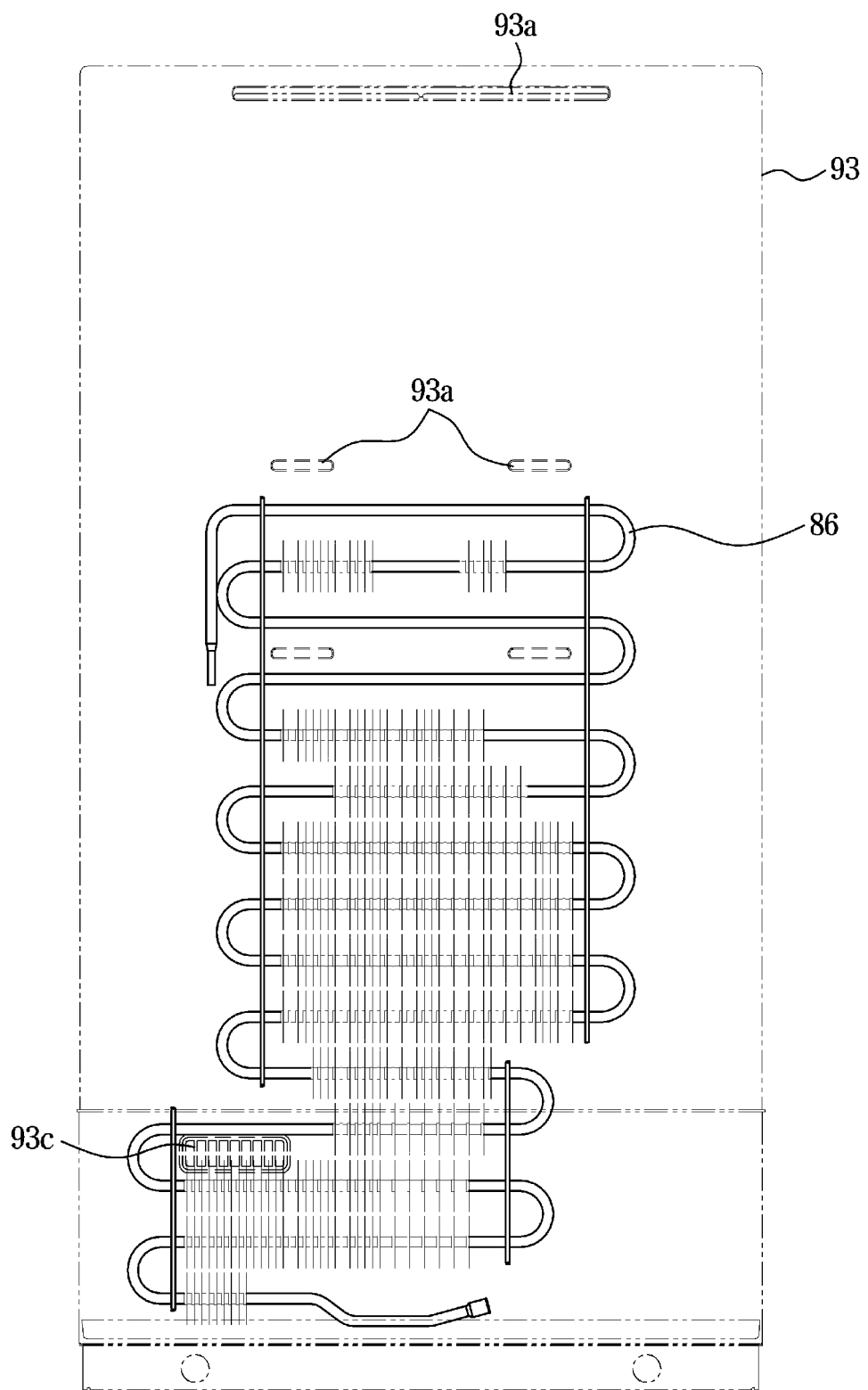
FIG. 4 illustrates a first rear panel and a first evaporator included in a refrigerator, according to an embodiment.

FIG. 3 illustrates a first rear panel, a first evaporator and a first container included in a refrigerator, according to an embodiment. FIG. 4 illustrates a first rear panel and a first evaporator included in a refrigerator, according to an embodiment.

As shown in FIGS. 3 and 4, the first rear panel 93 may be arranged behind the first storage chamber 40 to separate the first cooling duct 91 from the first storage chamber 40. The first evaporator 86 and the first fan 95 may be arranged in the first cooling duct 91. The first suction port 93b may be formed in a lower portion of the first rear panel 93, and the first outlet 93a may be formed in an upper portion of the first rear panel 93.

The first fan 95 may be arranged in the lower side of the first evaporator 86 for sucking the air of the first storage chamber 40 into the first cooling duct 91 through the first suction port 93b. Furthermore, the first fan 95 may discharge the cooled air of the first cooling duct 91 into the first storage chamber 40 through the first outlet 93a.

The first container 60 may include the first isolated room 61 provided to store foods or something. The first isolated room 61 may be divided by a partition 62 into a fresh room

61a on the left and a pantry room 61b on the right. Although the fresh room 61a and the pantry room 61b are shown as being arranged on the left and right of the first isolated room 61, respectively, the disclosed embodiments are not limited thereto.

The fresh room 61a and the pantry room 61b may be maintained at different temperatures. For example, the fresh room 61a may be maintained at a temperature of about 0 degree Celsius, and the pantry room 61b may be maintained at a temperature of about 3 degrees Celsius. The partition 62 to divide the first isolated room 61 into the fresh room 61a and the pantry room 62b may have a thermal insulation property, and may not be affected even when the fresh room 61a and the pantry room 61b are maintained at different temperatures.

The first container 60 may include an opening formed on the rear wall. The cooled air discharged from the auxiliary outlet 93c through the opening may flow into the first isolated room 61.

The auxiliary outlet 93c may be arranged on one side of the first rear panel 93 at a position corresponding to the fresh room 61a to discharge the cold air only to the fresh room 61a in the first isolated room 61 of the first container 60. Specifically, the auxiliary outlet 93c may be arranged at a position spaced apart from a virtual center line that vertically traverses the first rear panel 93.

As the fresh room 61a needs to be maintained at a temperature of about 0 degree Celsius, the extra auxiliary outlet 93c may be required to discharge the cooled air into the fresh room 61a. On the other hand, as the pantry room 61b is maintained at a temperature of about 3 degrees Celsius, the pantry room 61b may be maintained at the temperature of about 3 degrees Celsius by the cold air discharged into the first storage chamber 40 even without cold air directly discharged into the pantry room 61b.

The partition 62 may be arranged in the first container 60 to divide the first isolated room 61 into the fresh room 61a and the pantry room 61b. Optionally, the partition 62 may be slidably moved to the left or right in the first isolated room 61.

The first evaporator 86 may be arranged in the first cooling duct 91 separated by the first rear panel 93 from the first storage chamber 40. The first evaporator 86 may include a refrigerant tube through which the refrigerant passes, and a cooling fin for exchanging heat between the refrigerant and outside air.

The passing refrigerant may evaporate in the first evaporator 86 and absorb heat from the outside air through the cooling fin. In other words, the first evaporator 86 may cool the air of the first cooling duct 91.

The air cooled by the first evaporator 86 may be discharged into the first storage chamber 40 and the first container 60 through the first outlet 93a and the auxiliary outlet 93c, respectively. In this case, the auxiliary outlet 93c may be arranged on one side of the first rear panel 93 at a position corresponding to the fresh room 61a. For example, as shown in FIG. 4, the auxiliary outlet 93c may be arranged lopsidedly to the left from the center of the first rear panel 93.

The position of the auxiliary outlet 93c is not, however, limited to what is shown in FIG. 4. For example, the fresh room 61a may be arranged on the left of the first isolated room 61, and the auxiliary outlet 93c may also be arranged on the right from the center of the first rear panel 93.

The first evaporator 86 may be manufactured in the form that corresponds to the position of the auxiliary outlet 93c. For example, part of the first evaporator 86 may be formed lopsidedly to the left of the first cooling duct 91 to correspond to the position of the auxiliary outlet 93c formed lopsidedly to the left of the first rear panel 93. As shown in FIG. 4, part (upper part) of the first evaporator 86 may be placed in nearly the center of the first cooling duct 91, and another part (lower part) of the first evaporator 86 may be placed on the left to the center of the first cooling duct 91. In other words, the vertical center of the upper part of the first evaporator 86 may be different from the vertical center of the lower part of the first evaporator 86.

The form of the first evaporator 86 is not, however, limited to what is shown in FIG. 4. For example, the auxiliary outlet 93c may be arranged on the right from the center of the first rear panel 93, and part of the first evaporator 86 may be located on a right side to the center of the first cooling duct 91.

As such, due to the form of the first evaporator 86 corresponding to the position of the auxiliary outlet 93c, the air discharged through the auxiliary outlet 93c may be discharged after passing the lower portion of the first evaporator 86. Hence, the air cooled by the first evaporator 86 may be supplied directly into the first isolated room 61, and the first isolated room 61 may be maintained at a lower temperature than the first storage chamber 40.

Accordingly, based on the layout and sizes of the first outlet 93a and the auxiliary outlet 93c, flow rates of the cooled air to be supplied from the first cooling duct 91 to the first storage chamber 40 and the first isolated room 61 may be determined. Furthermore, depending on the flow rate of the cooled air to be supplied to each of the first storage chamber 40 and the first isolated room 61 and respective volumes (sizes) of the first storage chamber 40 and the first isolated room 61, temperature of the first storage chamber 40, temperature of the first isolated room 61, a difference between the temperature of the first storage chamber 40 and the temperature of, for example, the first isolated room 61 may be determined.

For example, the lower the temperature of the first storage chamber 40 set by the user, the larger the difference between the temperature of the first storage chamber 40 and the temperature of the first isolated room 61. Furthermore, the higher the temperature of the first storage chamber 40 set by the user, the smaller the difference between the temperature of the first storage chamber 40 and the temperature of the first isolated room 61.

Figure 5:
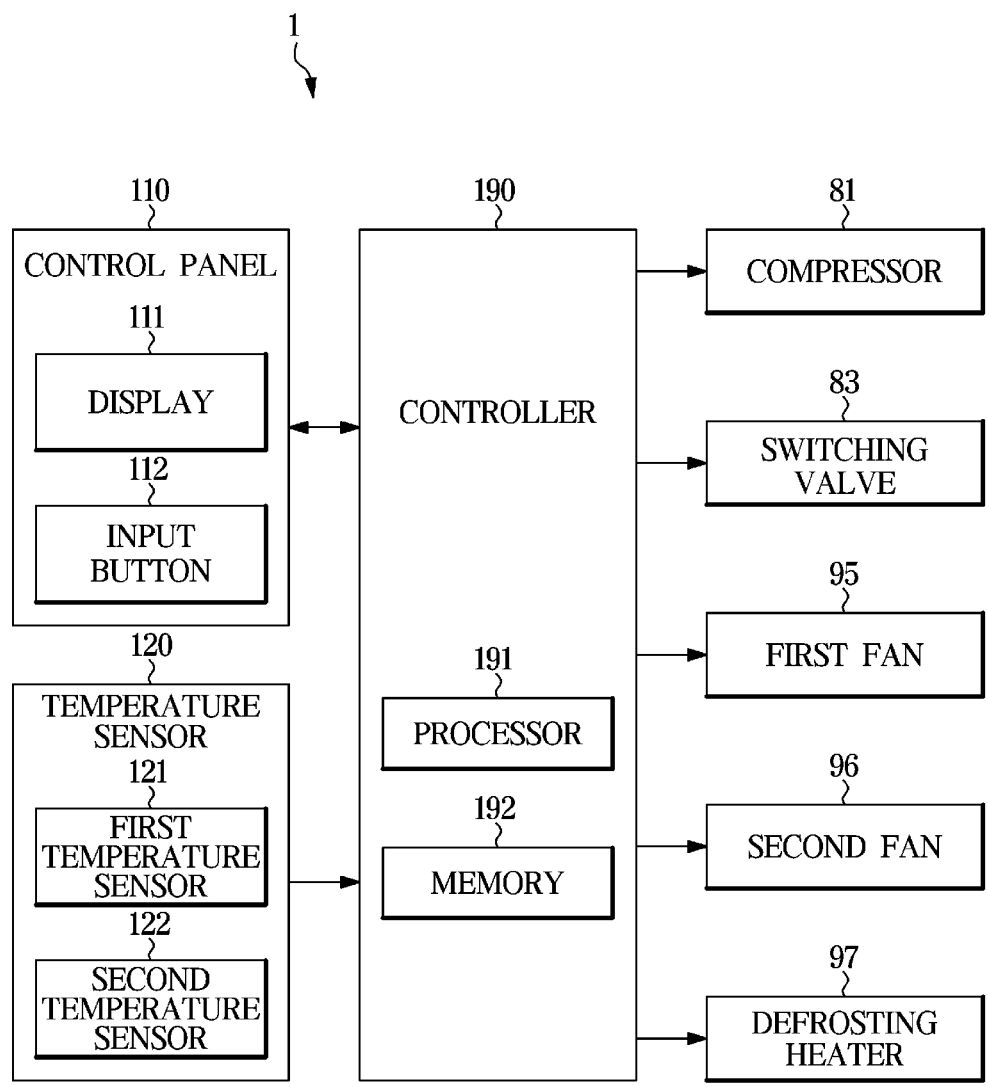
FIG. 5 is a block diagram of a refrigerator, according to an embodiment.

FIG. 5 is a block diagram of a refrigerator, according to an embodiment.

Referring to FIG. 5, a refrigerator 1 may include a control panel 110, a temperature sensor 120, the compressor 81, the switching valve 83, the first fan 95, the second fan 96, the defrosting heater 97 or a controller 190.

The control panel 110 may provide the user with a user interface to interact with the user. The control panel 110 may be arranged on the main body 10 or on the door 20 or 30. For example, the control panel 110 may be arranged on an edge of the open front of the main body 10 or an outer side of the first door 20.

The control panel 110 may include an input button 111 or a display 112.

The input button 111 may obtain a user input related to an operation of the refrigerator 1. For example, the input button 111 may obtain a first target temperature to control the temperature of the first storage chamber 40 or obtain a second target temperature to control the temperature of the second storage chamber 50.

The input button 111 may include a tact switch, a push switch, a slide switch, a toggle switch, a micro switch, or a touch switch.

The display 112 may display operation information of the refrigerator 1. For example, the display 112 may display temperature of the first storage chamber 40 or the second storage chamber 50.

Furthermore, the display 112 may display the user input obtained in association with the operation of the refrigerator 1. For example, the display 112 may display the first target temperature for the first storage chamber 40 obtained through the input button 111, or the second target temperature for the second storage chamber 50 obtained by the input button 111.

The display 112 may include, for example, a liquid crystal display (LCD) panel or an LED panel.

The temperature sensor 120 may include a first temperature sensor 121 arranged in the first storage chamber 40, or a second temperature sensor 122 arranged in the second storage chamber 50.

The first temperature sensor 121 may measure the temperature of the first storage chamber 40 and provide an electric signal (e.g., a voltage signal or current signal) corresponding to the temperature of the first storage chamber 40 to the controller 190. The controller 190 may identify a first measured temperature of the first storage chamber 40 based on the electric signal received from the first temperature sensor 121. The first temperature sensor 121 may include, for example, a thermistor whose electric resistance is changed according to the temperature.

The second temperature sensor 122 may measure the temperature of the second storage chamber 50 and provide an electric signal (e.g., a voltage signal or current signal) corresponding to the temperature of the second storage chamber 50 to the controller 190. The controller 190 may identify a second measured temperature of the second storage chamber 50 based on the electric signal received from the second temperature sensor 122. The second temperature sensor 122 may include, for example, a thermistor.

The compressor 81 may compress a gaseous refrigerant in response to a control signal from the controller 190. For example, the compressor 81 may include a motor and a compression tool, and the compression tool may compress the gaseous refrigerant and discharge the compressed refrigerant with the rotation of the motor. In this case, as the rotation speed of the motor increases, the amount of the compressed refrigerant discharged by the compressor 81 may increase, and as the rotation speed of the motor decreases, the amount of the compressed refrigerant discharged by the compressor 81 may decrease.

The switching valve 83 may provide the refrigerant in a liquid state condensed by the condenser 82 to the first expander 84 and the first evaporator 86 or to the second expander 85 and the second evaporator 87 based on a control signal from the controller 190. For example, the switching valve 83 may be a three-way valve including the inlet 83a, the first outlet 83b and the second outlet 83c. The switching valve 83 is not, however, limited to the three-way valve. For example, the switching valve 83 may be a valve module including a first valve arranged in the refrigerant tube 89 between the condenser 82 and the first expander 84 and a second valve arranged in the refrigerant tube 89 between the condenser 82 and the second expander 85.

The first fan 95 may be rotated in response to a control signal from the controller 190. The first fan 95 may suck the air of the first storage chamber 40 into the first cooling duct 91 and discharge the air of the first cooling duct 91 into the first storage chamber 40. The first fan 95 may include a motor and fan wings, and the fan wings rotated with the rotation of the motor may create a flow of air.

The second fan 96 may be rotated in response to a control signal from the controller 190. The second fan 96 may discharge the air of the second cooling duct 92 into the second storage chamber 50 and suck the air of the second storage chamber 50 into the second cooling duct 92. The second fan 96 may include a motor and fan wings.

The defrosting heater 97 may radiate heat to defrost the second evaporator 87 in response to a control signal from the controller 190.

The controller 190 may be electrically connected to the control panel 110, the temperature sensor 120, the compressor 81, the switching valve 83, the first fan 95, the second fan 96, or the defrosting heater 97. The controller 190 may control operations of the compressor 81, the switching valve 83, the first fan 95, the second fan 96, and/or the defrosting heater 97 based on an output of the control panel 110 and/or an output of the temperature sensor 120.

The controller 190 may include a processor 191 for generating a control signal to control operation of the refrigerator 1, and a memory 192 for memorizing and/or storing a program and data for generating the control signal. The controller 190 may include a plurality of processors or a plurality of memories. Furthermore, the processor 191 and the memory 192 may be implemented with separate semiconductor devices or in a single semiconductor device.

The processor 191 may process data and/or a signal based on the program provided from the memory 192, and provide a control signal to each component of the refrigerator 1 based on the processing result.

The processor 191 may output a control signal to perform a cooling operation of cooling the first storage chamber 40 and/or the second storage chamber 50 using the cooling device 80, or a defrosting operation of defrosting the first evaporator 86 and/or the second evaporator 87.

The processor 191 may receive an electric signal from the first temperature sensor 121 and/or the second temperature sensor 122 and process the received electric signal during the cooling operation. The processor 191 may identify the first measured temperature of the first storage chamber 40 and/or the second measured temperature of the second storage chamber 50 based on the processing of the electric signal.

The processor 191 may output control signals to control operations of the compressor 81, the first fan 95, the second fan 96 and/or the switching valve 83 to cool the first storage chamber 40 and/or the second storage chamber 50 based on the first measured temperature and/or the second measured temperature. For example, the processor 191 may output control signals to operate the compressor 81 and the first fan 95 and open the first outlet 83b of the switching valve 83 based on the first measured temperature higher than the first target temperature (e.g., positive 3 degrees Celsius) set through the control panel 110. Furthermore, the processor 191 may output control signals to operate the compressor 81 and the second fan 96 and open the second outlet 83c of the switching valve 83 based on the second measured temperature higher than a reference temperature (e.g., negative 20 degrees Celsius) set through the control panel 110.

The processor 191 may output control signals to control operations of the first fan 95 and/or the defrosting heater 97 to defrost the first evaporator 86 and/or the second evaporator 87, based on the first measured temperature and/or the second measured temperature. For example, the processor 191 may output control signals to stop the compressor 81, operate the first fan 95 and close the switching valve 83, based on the first measured temperature that has been higher than the first target temperature being lower than the first target temperature. Furthermore, the processor 191 may output control signals to stop the compressor 81 and the second fan 96, operate the defrosting heater 97, and close the switching valve 83, based on the second measured temperature that has been higher than the second target temperature being lower than the second target temperature.

The processor 191 may include an operation circuit, a storage circuit, and a control circuit. The processor 191 may include one or multiple chips. Furthermore, the processor 191 may include one or multiple cores.

The memory 192 may memorize/store a program and data for controlling the cooling operation and the defrosting operation of the refrigerator 1.

The memory 192 may include a volatile memory, such as a static random access memory (S-RAM), a dynamic RAM (D-RAM), and a non-volatile memory, such as a read only memory (ROM) or an erasable programmable ROM (EPROM). The memory 192 may include a memory device, or multiple memory devices.

As described above, the controller 190 may control the cooling operation and the defrosting operation of the refrigerator 1.

Figure 6:
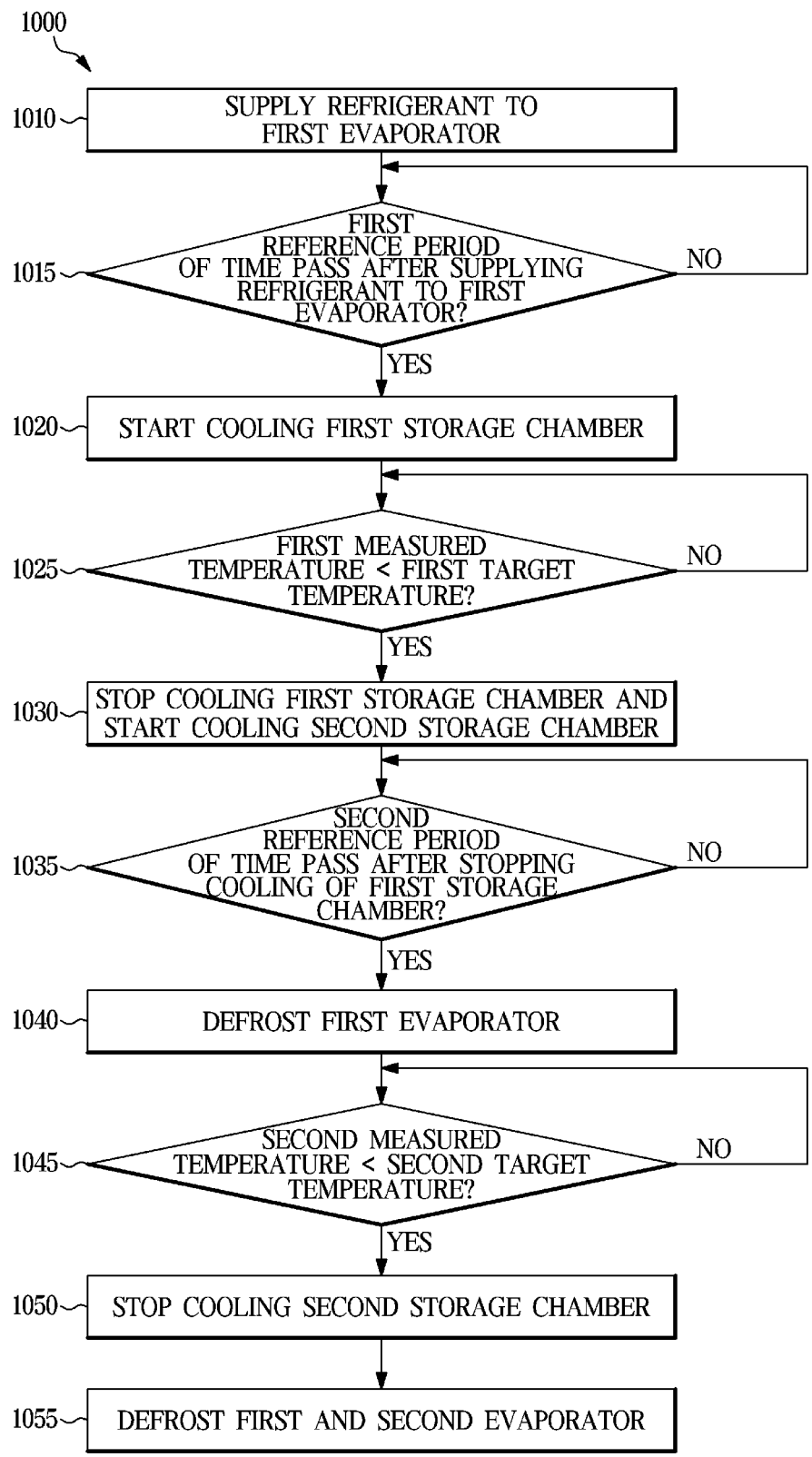
FIG. 6 illustrates an example of cooling/defrosting operation of a refrigerator, according to an embodiment.
Figure 7:
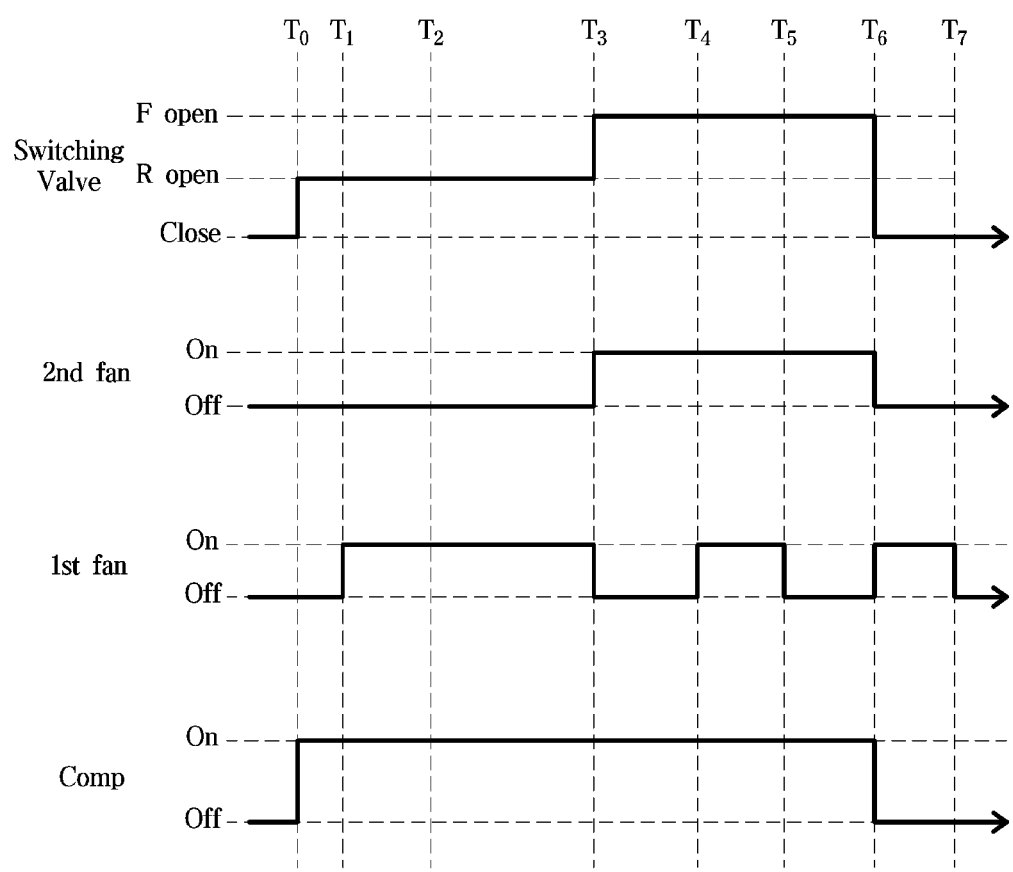
FIG. 7 illustrates an example of operations of a compressor, a first fan, a second fan, and a switching valve included in a refrigerator, according to an embodiment.

FIG. 6 illustrates an example of cooling/defrosting operation of a refrigerator, according to an embodiment. FIG. 7 illustrates an example of operations of a compressor, a first fan, a second fan, and a switching valve included in a refrigerator, according to an embodiment.

In connection with FIGS. 6 and 7, operation 1000 of the refrigerator 1 will be described.

The refrigerator 1 may supply the refrigerant to the first evaporator 86, in 1010. For example, the refrigerator 1 may operate the compressor 81 and open the first outlet 83b of the switching valve 83.

During a standby mode in which the refrigerator 1 is not performing the cooling operation or the defrosting operation, the compressor 81, the first fan 95 and the second fan 96 may be stopped and the switching valve 83 may remain in the closed state.

The controller 190 may identify the first measured temperature of the first storage chamber 40 based on the output of the first temperature sensor 121. The controller 190 may perform the cooling operation for the first storage chamber 40 based on the first measured temperature lower than the first target temperature input by the user.

The controller 190 may operate the stopped compressor 81 and control the switching valve 83 to open the first outlet 83b in order to supply the refrigerant to the first evaporator 86. For example, as shown in FIG. 7, the compressor 81 may be operated and the first outlet 83b of the switching valve 83 may be opened at time T0.

With the opening of the first outlet 83b, a refrigerant cycle circuit connecting the compressor 81, the condenser 82, the first expander 84 and the first evaporator 86 may be formed. Furthermore, as the first outlet 83b is opened and the compressor 81 is operated, the remaining gaseous refrigerant in the first evaporator 86 may be sucked into the compressor 81. The compressor 81 may compress the gaseous refrigerant. The compressed high-temperature refrigerant may be condensed in the condenser 82. The condensed refrigerant may be expanded in the first expander 84. The expanded low-temperature refrigerant may be evaporated in the first evaporator 86. As such, with the opening of the first outlet 83b and operation of the compressor 81, the first evaporator 86 may be cooled.

The refrigerator 1 may identify whether a first reference period of time has passed since the refrigerant was supplied to the first evaporator 86, in 1015. For example, the refrigerator 1 may identify whether the first reference period of time has passed since the operation of the compressor 81 and the opening of the first outlet 83b. Furthermore, when the first reference period of time has not passed since the refrigerant was supplied to the first evaporator 86 in 1015, the refrigerator 1 may continue to supply the refrigerant to the first evaporator 86 without rotation of the first fan 95.

The controller 190 may identify whether a period of time that has passed since the refrigerant was supplied to the first evaporator 86 is equal to or greater than the first reference period of time. For example, the controller 190 may include a timer, and use the timer to count time that has passed after the opening of the first outlet 83b. For example, the controller 190 may include an oscillation circuit for outputting a pulse (clock) at regular intervals, and count time that has passed since the first outlet 83b was opened by counting the pulse (clock).

The controller 190 may compare the time that has passed after opening the first outlet 83b with the first reference period of time, and identify whether the time that has passed after opening the first outlet 83b is equal to or greater than the first reference period of time.

The controller 190 may supply the refrigerant to the first evaporator 86 without rotation of the first fan 95 for the first reference period of time after opening the first outlet 83b. For example, as shown in FIG. 7, the compressor 81 may be operated without rotation of the first fan 95 between time T0 and time T1. Accordingly, the refrigerant may continue to evaporate in the first evaporator 86 without a flow of air around the first evaporator 86 for the first reference period of time after opening the first outlet 83b.

As the expanded low-temperature refrigerant is provided to the first evaporator 86, the temperature of the first evaporator 86 may drop. With the drop of temperature of the first evaporator 86, an interval of the first evaporator 86 cooled by evaporation of the refrigerant may increase.

Specifically, when the expanded low-temperature refrigerant starts to be supplied to the first evaporator 86, the refrigerant may all be evaporated at an entrance part of the first evaporator 86 due to the high-temperature of the first evaporator 86. Hence, the temperature of the entrance part of the first evaporator 86 decreases.

Due to the decrease in temperature of the entrance part of the first evaporator 86, an area where the refrigerant evaporates may be gradually expanded from the entrance part of the first evaporator 86 to an exit part of the first evaporator 86. After this, when a sufficient time passes, evaporation of the refrigerant may occur in the whole area of the first evaporator 86 and the whole first evaporator 86 may be cooled.

As such, at a point in time at which operation of the compressor 81 is started, only the entrance part of the first evaporator 86 may be cooled but the exit part of the first evaporator 86 may not be cooled.

For example, in FIG. 4 as described above, the upper portion of the first evaporator 86 may be connected to the first expander 84, and the lower portion of the first evaporator 86 may be connected to the compressor 81. Accordingly, at a point in time at which the compressor 81 starts to be operated, the upper portion of the first evaporator 86 may be cooled but the lower portion of the first evaporator 86 may not be cooled.

The air supplied into the first storage chamber 40 through the first outlet 93a may pass the upper portion of the first evaporator 86, and the air supplied into the first isolated room 61 through the auxiliary outlet 93*c* may pass only the lower portion of the first evaporator 86 without passing the upper portion of the first evaporator 86. Hence, cooled air may be supplied into the first storage chamber 40, and non-cooled air may be supplied into the first isolated room 61. This may make the temperature of the first isolated room 61 maintained to be lower than the temperature of the first storage chamber 40 relatively slowly decrease, and reduce a difference in temperature between the first storage chamber 40 and the first isolated room 61.

As such, with the rotation of the first fan 95 as well as the operation of the compressor 81, the difference in temperature between the first storage chamber 40 and the first isolated room 61 may be reduced. Furthermore, due to a flow of surrounding air of the first evaporator 86, heat exchange may occur between the first evaporator 86 and the surrounding air and cooling of the entire first evaporator 86 may be delayed. Accordingly, the difference in temperature between the first storage chamber 40 and the first isolated room 61 may be further reduced.

To prevent the reduction of the difference in temperature between the first storage chamber 40 and the first isolated room 61, the controller 190 may delay operation of the first fan 95 for the first reference period of time.

Furthermore, while the operation of the first fan 95 is delayed, the air cooled by the first evaporator 86 may not be provided into the first storage chamber 40 or the first isolated room 61. As the surrounding air of the first evaporator 86 does not flow, heat exchange between the first evaporator 86 and the surrounding air may be prevented or suppressed and the first evaporator 86 may be rapidly cooled.

The controller 190 may delay operation of the first fan 95 until the whole first evaporator 86 is cooled and evaporation of the refrigerant occurs in the entire first evaporator 86. Accordingly, the difference in temperature between the first storage chamber 40 and the first isolated room 61 may be maintained.

In this case, the first reference period of time may refer to a time until the whole first evaporator 86 is cooled and evaporation of the refrigerant occurs in the entire first evaporator 86. The first reference period of time may be set experimentally or empirically.

When the first reference period of time passes after the refrigerant is supplied to the first evaporator 86 in 1015, the refrigerator 1 may cool the first storage chamber 40 in 1020. For example, the refrigerator 1 may rotate the first fan 95 as well as supply the refrigerant to the first evaporator 86.

The controller 190 may rotate the first fan 95 based on the passage of the first reference period of time after opening the first outlet 83*b*. For example, as shown in FIG. 7, the first fan 95 may start to be rotated at time T1.

With the rotation of the first fan 95 as well as operation of the compressor 81, the air cooled by the first evaporator 86 may be provided into the first storage chamber 40 and first isolated room 61. Furthermore, the temperature of both the first storage chamber 40 and the first isolated room 61 may be lowered.

As described above, by operating the compressor 81 without rotation of the first fan 95 for a first period of time, the refrigerant may be evaporated in the entire first evaporator 86. Hence, the whole first evaporator 86 may all be cooled.

As the whole first evaporator 86 is all be cooled, the air supplied into the first isolated room 61 through the auxiliary outlet 93*c* may be cooled by the first evaporator 86 as sufficiently as the air supplied into the first storage chamber 40 through the first outlet 93*a*. Furthermore, the difference in temperature between the first isolated room 61 and the first storage chamber 40 may be maintained.

The refrigerator 1 may identify whether the first measured temperature is lower than the first target temperature, in 1025. When the first measured temperature is not lower than the first target temperature in 1025, the refrigerator 1 may continue to cool the first storage chamber 40.

As the compressor 81 is operated, the first outlet 83*b* is opened and the first fan 95 is operated, the cooled air may be supplied into the first storage chamber 40 and the first isolated room 61. Furthermore, the temperature of the first storage chamber 40 may drop.

While the compressor 81 and the first fan 95 are operated, the controller 190 may identify the first measured temperature of the first storage chamber 40 based on an output of the first temperature sensor 121, and compare the first measured temperature with the first target temperature.

The controller 190 may continue to cool the first storage chamber 40 based on the first measured temperature equal to or higher than the first target temperature during the cooling of the first storage chamber 40. For example, as shown in FIG. 7, between time T1 and T3, the compressor 81 may be operated, the first outlet 83*b* may be opened, and the first fan 95 may be operated.

When the first measured temperature is lower than the first target temperature in 1025, the refrigerator 1 may stop cooling the first storage chamber 40 and cool the second storage chamber 50 in 1030. For example, the refrigerator 1 may close the first outlet 83*b* of the switching valve 83, open the second outlet 83*c*, stop the first fan 95, and operate the second fan 96.

The controller 190 may identify the second measured temperature of the second storage chamber 50 based on the output of the second temperature sensor 122. The controller 190 may perform a cooling operation for the second storage chamber 50 based on the second measured temperature lower than the second target temperature input by the user.

The controller 190 may continue to operate the compressor 81 and control the switching valve 83 to close the first outlet 83*b* and open the second outlet 83*c*, in order to cool the second storage chamber 50 after cooling the first storage chamber 40. Furthermore, the controller 190 may stop the first fan 95 and operate the second fan 96. For example, as shown in FIG. 7, the first outlet 83*b* of the switching valve 83 may be closed and the second outlet 83*c* may be opened at time T3. Furthermore, the first fan 95 may be stopped and the second fan 96 may be rotated.

As the first outlet 83*b* is closed and the second outlet 83*c* is opened, a refrigerant cycle circuit connecting the compressor 81, the condenser 82, the first expander 84 and the first evaporator 86 may be closed, and a refrigerant cycle circuit connecting the compressor 81, the condenser 82, the second expander 85 and the second evaporator 87 may be formed.

With the evaporation of the refrigerant in the second evaporator 87, the second evaporator 87 may be cooled. Furthermore, with the operation of the second fan 96, the air cooled by the second evaporator 87 may be provided into the second storage chamber 50.

The refrigerator 1 may identify whether a second reference period of time has passed since the cooling of the first storage chamber 40 was stopped, in 1035. For example, the refrigerator 1 may identify whether the second reference period of time has passed since the first outlet 83*b* was closed. When the second reference period of time has not passed since the cooling of the first storage chamber 40 was stopped in 1035, the refrigerator 1 may continue to cool the second storage chamber 50.

Using the clock of the oscillation circuit or the timer, the controller 190 may identify whether a period of time that has passed since the first outlet 83b was closed is equal to or greater than the second reference period of time.

The controller 190 may compare the period of time that has passed since the first outlet 83b was closed with the second reference period of time, and when the period of time that has passed since the first outlet 83b was closed is less than the second reference period of time, open the second outlet 83c and continue to operate the second fan 96.

When the second reference period of time passes after the refrigerant is stopped being supplied to the first evaporator 86 in 1035, the refrigerator 1 may defrost the first evaporator 86 in 1040. For example, the refrigerator 1 may rotate the first fan 95 for a first defrosting period of time.

The controller 190 may rotate the first fan 95 based on the passage of the second reference period of time after closing the first outlet 83b. For example, as shown in FIG. 7, the first fan 95 may start to be rotated at time T4, and the first fan 95 may be rotated between time T4 and time T5. In other words, the controller 190 may start defrosting the first evaporator 86 after the lapse of the second reference period of time after the stopping of supplying the refrigerant to the first evaporator 86.

While the refrigerant is evaporated in the evaporator, the evaporator may be covered with frost due to deposition or freezing. The frost formed on the evaporator hinders heat exchange between the evaporator and the air, deteriorating cooling efficiency of the refrigerator. To prevent this, the refrigerator may usually start defrosting the evaporator as soon as stopping supplying the refrigerant to the evaporator.

The refrigerator 1 may be equipped with the defrosting heater 97 for defrosting the second evaporator 87 of the freezer but may not include a defrosting heater for defrosting the first evaporator 86 of the fridge. Defrosting of the first evaporator 86 may be performed by rotation of the first fan 95.

The first storage chamber 40 may be maintained at a positive temperature higher than 0 degree Celsius. Hence, the first evaporator 86 may be defrosted by supplying the air of the first storage chamber 40 to the first evaporator 86.

Defrosting of the first evaporator 86 with the first fan 95 may cause blending of the air of the first storage chamber 40 and the air of the first isolated room 61. For example, when the refrigerant stops being supplied to the first evaporator 86, cooling of the first evaporator 86 may be stopped. In this case, when the first fan 95 is operated, the air of the first cooling duct 91 that has not been sufficiently cooled may be provided to the first storage chamber 40 and the first isolated room 61. Hence, the difference in internal temperature between the first storage chamber 40 and the first isolated room 61 may be reduced.

On the other hand, when defrosting of the first evaporator 86 with the first fan 95 is delayed, blending of the air of the first storage chamber 40 and the air of the first isolated room 61 may be delayed. Furthermore, the difference in internal temperature between the first storage chamber 40 and the first isolated room 61 may be maintained as designed in advance.

For this reason, the controller 190 may delay defrosting of the first evaporator 86 with the first fan 95 for the second reference period of time after closing the first outlet 83b. Furthermore, the controller 190 may rotate the first fan 95 for the first defrosting period of time to defrost the first evaporator 86 when the second reference period of time elapses after closing the first outlet 83b.

The controller 190 may stop rotating the first fan 95 based on the passage of the first defrosting period of time after rotating the first fan 95. In this case, to minimize blending of the air of the first storage chamber 40 and the air of the first isolated room 61, the first defrosting period of time may be minimized. The first defrosting period of time may be set experimentally or empirically.

The refrigerator 1 may identify whether the second measured temperature is lower than the second target temperature, in 1045. When the second measured temperature is not lower than the second target temperature in 1045, the refrigerator 1 may continue to cool the second storage chamber 50.

As the compressor 81 is operated, the second outlet 83c is opened and the second fan 96 is operated, the cooled air may be supplied into the second storage chamber 50. Furthermore, the temperature of the second storage chamber 50 may drop.

While the compressor 81 and the second fan 96 are operated, the controller 190 may identify the second measured temperature of the second storage chamber 50 based on an output of the second temperature sensor 122, and compare the second measured temperature with the second target temperature.

The controller 190 may continue to cool the second storage chamber 50 based on the second measured temperature equal to or higher than the second target temperature during the cooling of the second storage chamber 50. In other words, the controller 190 may continue to operate the compressor 81, open the second outlet 83c and operate the second fan 96.

When the second measured temperature is lower than the second target temperature in 1045, the refrigerator 1 may stop cooling the second storage chamber 50 in 1050. For example, the refrigerator 1 may stop the compressor 81, close the switching valve 83, and stop the second fan 96.

When cooling of the second storage chamber 50 is completed, the controller 190 may stop operation of the compressor 81, close both the first and second outlets of the switching valve 83, and stop the second fan 96. For example, as shown in FIG. 7, the compressor 81 may be stopped, the switching valve 83 may be closed, and the second fan 96 may be stopped at time T6.

Furthermore, the refrigerator 1 may defrost the first evaporator 86 and the second evaporator 87, in 1055. For example, the refrigerator 1 may rotate the first fan 95 and operate the defrosting heater 97 for a second defrosting period of time.

The controller 190 may rotate the first fan 95 for the second defrosting period of time to defrost the first evaporator 86. Furthermore, the controller 190 may operate the defrosting heater 97 to defrost the second evaporator 87. For example, as shown in FIG. 7, the first fan 95 may be rotated between time T6 and time T7.

As described above, to minimize blending of the air of the first storage chamber 40 and the air of the first isolated room 61, the first defrosting period of time may be minimized. To compensate the minimized first defrosting period of time, the controller 190 may operate the first fan 95 for the second defrosting period of time after the compressor 81 is stopped. The second defrosting period of time may be set experimentally or empirically.

As described above, the refrigerator 1 may perform a cooling operation of controlling the temperature of the first and second storage chambers 40 and 50. The cooling operation may include delaying operation of the first fan 95 and delaying defrosting of the first evaporator 86.

The delaying of the operation of the first fan 95 may prevent or suppress non-cooled air from being provided into the first isolated room 61. The delaying of frosting of the first evaporator 86 may prevent or suppress blending of the air of the first storage chamber 40 and the air of the first isolated room 61.

As such, to maintain the difference in temperature between the first storage chamber 40 and the first isolated room 61, the refrigerator 1 may delay operation of the first fan 95 for cooling operation of the first storage chamber 40 and delay operation of the first fan 95 for defrosting operation of the first evaporator 86.

Figure 8:
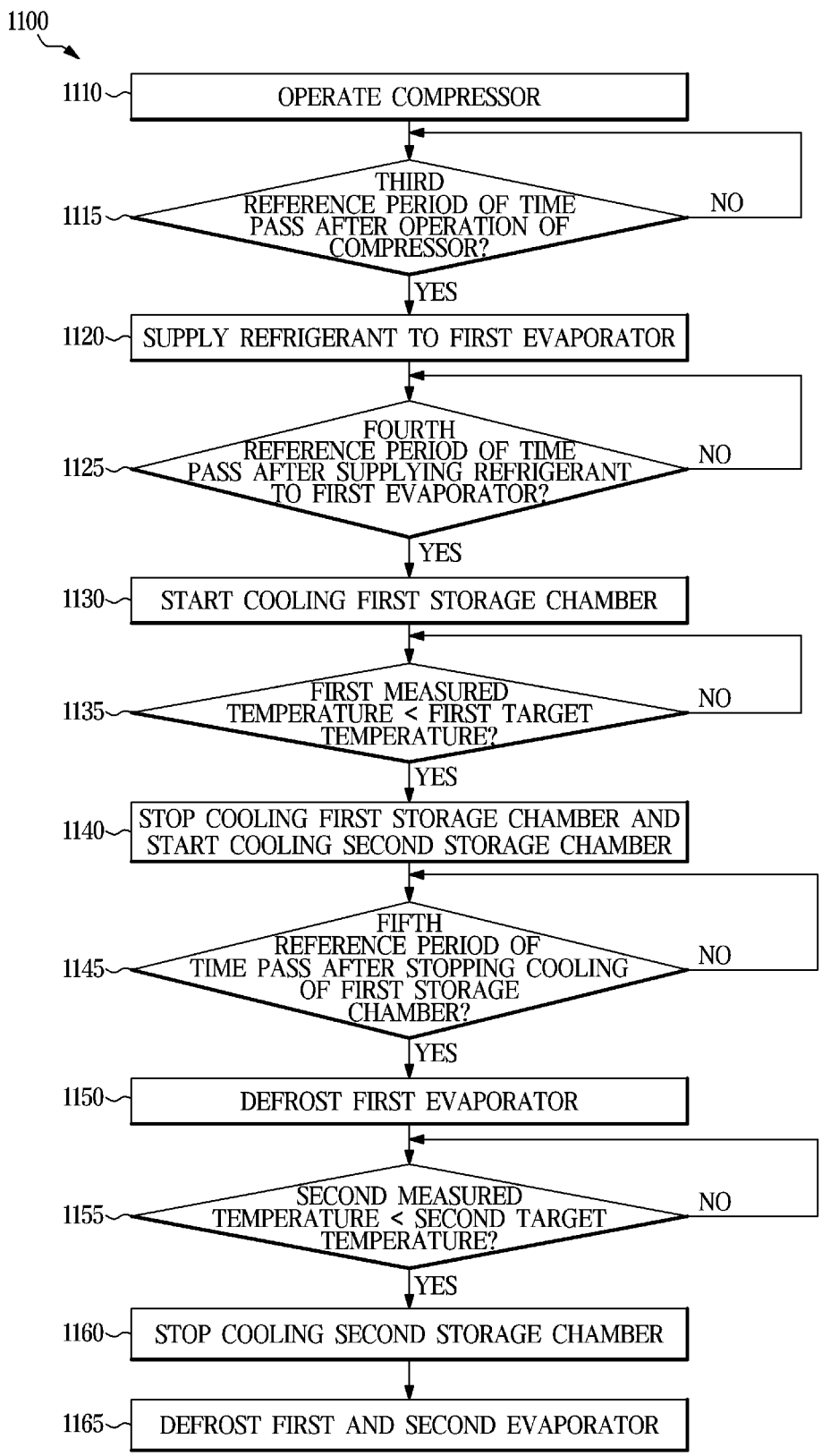
FIG. 8 illustrates an example of cooling/defrosting operation of a refrigerator, according to an embodiment.
Figure 9:
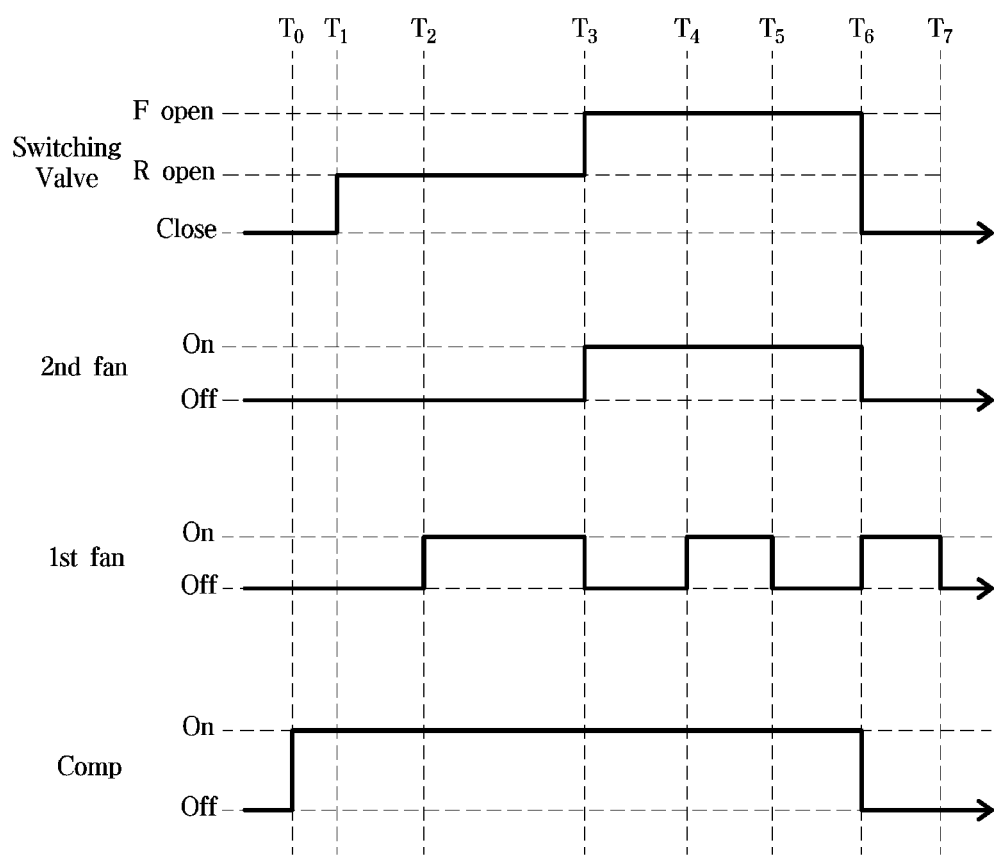
FIG. 9 illustrates an example of operations of a compressor, a first fan, a second fan, and a switching valve included in a refrigerator, according to an embodiment.

FIG. 8 illustrates an example of cooling/defrosting operation of a refrigerator, according to an embodiment. FIG. 9 illustrates an example of operations of a compressor, a first fan, a second fan, and a switching valve included in a refrigerator, according to an embodiment.

In connection with FIGS. 8 and 9, operation 1100 of the refrigerator 1 will be described.

The refrigerator 1 may operate the compressor 81, in 1110.

During a standby mode in which the refrigerator 1 is not performing the cooling operation or the defrosting operation, the compressor 81, the first fan 95 and the second fan 96 may be stopped and the switching valve 83 may remain in the closed state.

In this case, the controller 190 may perform the cooling operation for the first storage chamber 40 based on the first measured temperature from an output of the first temperature sensor 121 lower than the first target temperature input by the user.

The controller 190 may operate the stopped compressor 81 without opening the switching valve 83. For example, as shown in FIG. 9, the compressor 81 may be operated at time T0.

As the switching valve 83 is closed, a refrigerant cycle circuit connecting the compressor 81, the condenser 82, the expander and the evaporator may not be formed. However, the compressor 81 may still be connected to the condenser 82 and the evaporator.

As such, when the compressor 81 is operated while the switching valve 83 is closed, the compressor 81 may retrieve the refrigerant from the evaporator. For example, the target temperature of the second storage chamber 50, the freezer, is lower than the target temperature of the first storage chamber 40, the fridge, and accordingly, pressure of the refrigerant in the second evaporator 87 may be higher than pressure of the refrigerant in the first evaporator 86.

To retrieve the remaining refrigerant in the second evaporator 87 before supplying the refrigerant to the first evaporator 86, the controller 190 may operate the compressor 81 while the switching valve 83 is closed.

With the retrieval of the refrigerant from the evaporator, cooling efficiency of the storage chamber may be improved. When the refrigerant is supplied to the evaporator from the compressor 81, the evaporator may be rapidly cooled. Furthermore, the controller 190 may reserve the refrigerant to be supplied up to the rear end (lower part) of the first evaporator 86 by retrieving the refrigerant from the evaporator.

Accordingly, the difference in temperature between the first storage chamber 40 and the first isolated room 61 may be maintained as designed.

The refrigerator 1 may identify whether the third reference period of time has passed since the compressor 81 was operated, in 1115. When the third reference period of time has not passed since the compressor 81 was operated in 1115, the refrigerator 1 may continue to operate the compressor 81 without opening the switching valve 83.

The controller 190 may use a timer or the pulse (clock) of an oscillation circuit to identify a time that has elapsed since the operation of the compressor 81. The controller 190 may compare the time having elapsed since the operation of the compressor 81 with the third reference period of time.

The third reference period of time may be set to a time for which to retrieve all the remaining refrigerant in the evaporator according to the operation of the compressor 81. The third reference period of time may be set experimentally or empirically.

The controller 190 may operate the compressor 81 for the third reference period of time while the switching valve 83 is closed. For example, as shown in FIG. 9, the compressor 81 may be operated while the switching valve 83 is closed between time T0 and time T1. Accordingly, the remaining refrigerant in the evaporator may be retrieved.

When the third reference period of time has passed since the operation of the compressor 81 in 1115, the refrigerator 1 may supply the refrigerant to the first evaporator 86 in 1120.

The operation 1120 may be the same as the operation 1010 of FIG. 6. For example, as shown in FIG. 9, the compressor 81 may be operated and the first outlet 83b of the switching valve 83 may be opened at time T1.

The refrigerator 1 may identify whether a fourth reference period of time has passed since the refrigerant was supplied to the first evaporator 86, in 1125. When the fourth reference period of time has not passed since the refrigerant was supplied to the first evaporator 86 in 1125, the refrigerator 1 may continue to supply the refrigerant to the first evaporator 86 without rotation of the first fan 95. When the fourth reference period of time has passed since the refrigerant was supplied to the first evaporator 86 in 1125, the refrigerator 1 may cool the first storage chamber 40 in 1130.

The operations 1125 and 1130 may be the same as the operations 1015 and 1020 shown in FIG. 6, respectively. For example, as shown in FIG. 9, the refrigerant may be supplied to the first evaporator 86 without rotation of the first fan 95 between time T1 and T2, and the first fan 95 may start to be rotated at time T2.

As such, the controller 190 may delay operation of the first fan 95 after supplying the refrigerant to the first evaporator 86. Accordingly, the difference in temperature between the first storage chamber 40 and the first isolated room 61 may be maintained.

The refrigerator 1 may identify whether the first measured temperature is lower than the first target temperature, in 1135. When the first measured temperature is lower than the first target temperature in 1135, the refrigerator 1 may stop cooling the first storage chamber 40 and cool the second storage chamber 50 in 1140.

The operations 1135 and 1140 may be the same as the operations 1025 and 1030 shown in FIG. 6, respectively. For example, as shown in FIG. 9, the compressor 81 may be operated, the first outlet 83b may be opened, and the first fan 95 may be operated between time T2 and T3. Furthermore, the first outlet 83b of the switching valve 83 may be closed, the second outlet 83c may be opened, the first fan 95 may be stopped, and the second fan 96 may be rotated at time T3.

The refrigerator 1 may identify whether a fifth reference period of time has passed since the cooling of the first storage chamber 40 was stopped, in 1145. When the fifth reference period of time has passed since the refrigerant was stopped being supplied to the first evaporator 86 in 1145, the refrigerator 1 may defrost the first evaporator 86 in 1150.

The operations 1145 and 1150 may be the same as the operations 1035 and 1040 shown in FIG. 6, respectively. For example, as shown in FIG. 9, the first fan 95 may start to be rotated at time T4, and the first fan 95 may be rotated between time T4 and T5.

As such, the controller 190 may delay defrosting of the first evaporator 86 after stopping supplying the refrigerant to the first evaporator 86. Accordingly, the difference in internal temperature between the first storage chamber 40 and the first isolated room 61 may be maintained as designed in advance.

The refrigerator 1 may identify whether the second measured temperature is lower than the second target temperature, in 1155. When the second measured temperature is lower than the second target temperature in 1155, the refrigerator 1 may stop cooling the second storage chamber 50 in 1160.

The operations 1155 and 1160 may be the same as the operations 1145 and 1150 shown in FIG. 6, respectively. For example, as shown in FIG. 9, the compressor 81 may be stopped, the switching valve 83 may be closed, and the second fan 96 may be stopped at time T6.

The refrigerator 1 may defrost the first evaporator 86 and the second evaporator 87, in 1165.

The operation 1165 may be the same as the operation 1055 of FIG. 6. For example, as shown in FIG. 9, the first fan 95 may be rotated between time T6 and time T7.

As described above, the refrigerator 1 may retrieve the remaining refrigerant in the evaporator before the cooling operation of the storage chamber. Accordingly, cooling efficiency of the storage chamber may be improved.

Furthermore, the refrigerator 1 may delay operation of the first fan 95 for cooling operation of the first storage chamber 40 and delay operation of the first fan 95 for defrosting operation of the first evaporator 86. Accordingly, the difference in temperature between the first storage chamber 40 and the first isolated room 61 may be maintained.

As such, to maintain the difference in temperature between the first storage chamber 40 and the first isolated room 61, the refrigerator 1 may retrieve the remaining refrigerant in the evaporator, delay operation of the first fan 95 for cooling operation of the first storage chamber 40 and delay operation of the first fan 95 for defrosting operation of the first evaporator 86.

The operation 1100 of the refrigerator 1 as shown in FIG. 8 may further include retrieving the remaining refrigerant in the evaporator as compared to the operation 1000 of the refrigerator 1 as shown in FIG. 6. Hence, compared to the operation 1000 of the refrigerator 1, the operation 1100 of the refrigerator 1 may maintain a bigger difference in temperature between the first storage chamber 40 and the first isolated room 61.

Accordingly, when there is a need to increase the difference in temperature between the first storage chamber 40 and the first isolated room 61, the operation 1100 may be performed. For example, when the target temperature of the first storage chamber 40 is lower than the first reference temperature, the refrigerator 1 may perform the operation 1100, and when the target temperature of the first storage chamber 40 is equal to or higher than the first reference temperature, the refrigerator 1 may perform the operation 1000.

In other words, the refrigerator 1 may perform one of the operation 1000 and the operation 1100 based on the target temperature of the first storage chamber 40 input by the user.

Figure 10:
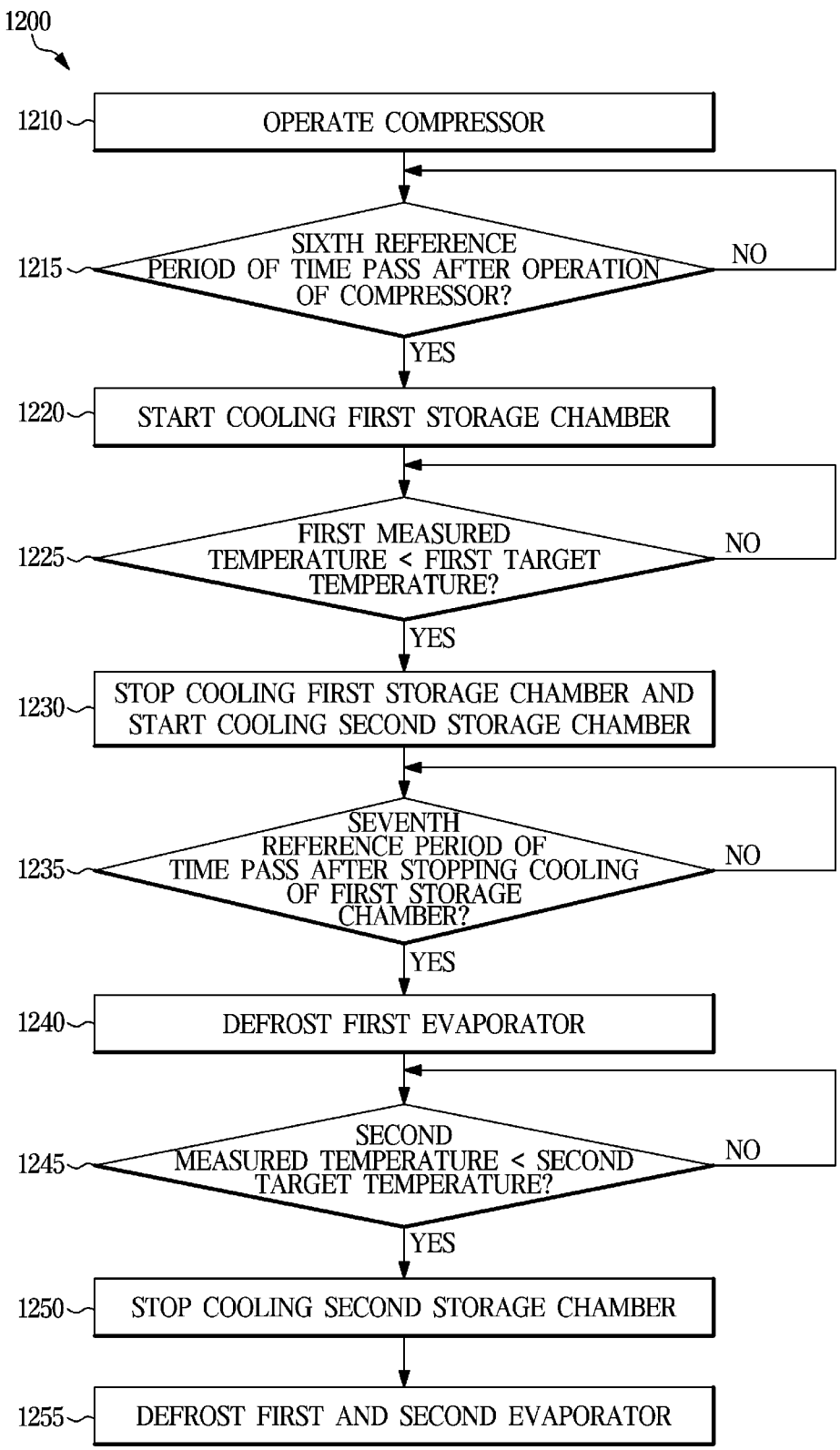
FIG. 10 illustrates an example of cooling/defrosting operation of a refrigerator, according to an embodiment.
Figure 11:
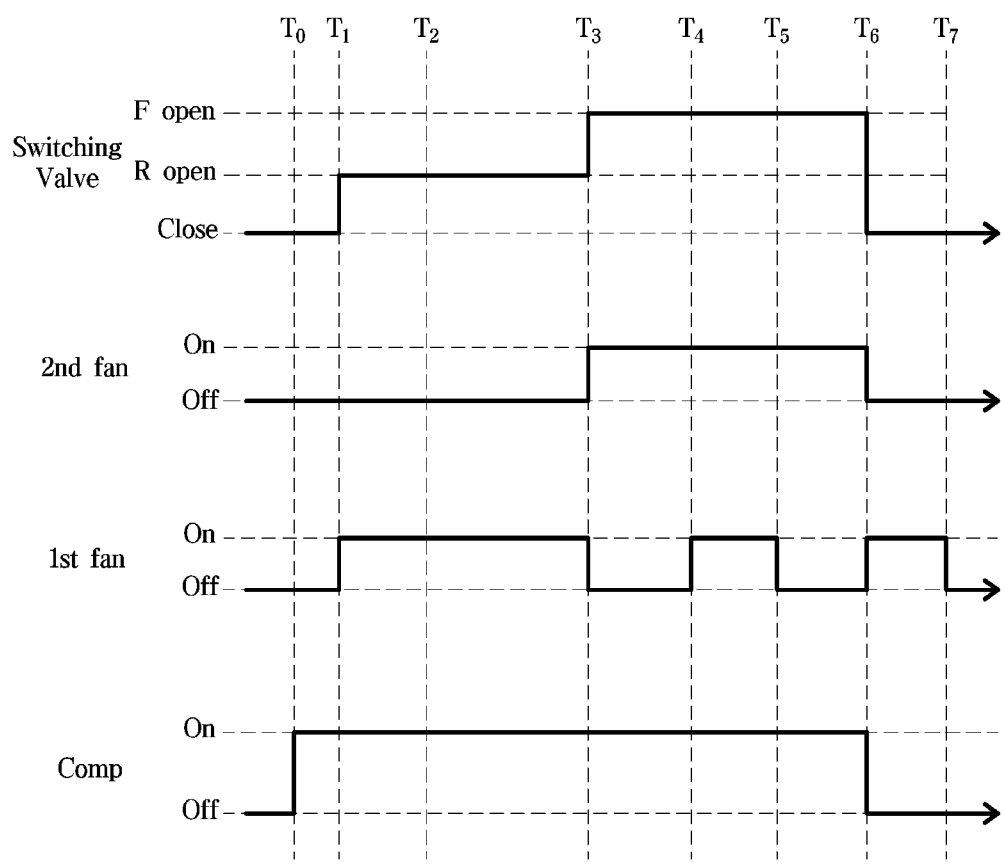
FIG. 11 illustrates an example of operations of a compressor, a first fan, a second fan, and a switching valve included in a refrigerator, according to an embodiment.

FIG. 10 illustrates an example of cooling/defrosting operation of a refrigerator, according to an embodiment. FIG. 11 illustrates an example of operations of a compressor, a first fan, a second fan, and a switching valve included in a refrigerator, according to an embodiment.

In connection with FIGS. 10 and 11, operation 1200 of the refrigerator 1 will be described.

The refrigerator 1 may operate the compressor 81, in 1210.

The operation 1210 may be the same as the operation 1110 of FIG. 8. For example, as shown in FIG. 11, the compressor 81 may be operated at time T0.

The refrigerator 1 may identify whether a sixth reference period of time has passed since the compressor 81 was operated, in 1215. When the sixth reference period of time has passed since the operation of the compressor 81 in 1215, the refrigerator 1 may cool the first storage chamber 40 in 1220.

The operations 1215 and 1220 may be the same as the operations 1115 and 1120 shown in FIG. 8, respectively. For example, as shown in FIG. 11, the compressor 81 may be operated while the switching valve 83 is closed between time T0 and T1, and the first outlet 83*b* of the switching valve 83 may be opened and the first fan 95 may be rotated at time T1.

The refrigerator 1 may identify whether the first measured temperature is lower than the first target temperature, in 1225. When the first measured temperature is lower than the first target temperature in 1225, the refrigerator 1 may stop cooling the first storage chamber 40 and cool the second storage chamber 50 in 1230.

The operations 1225 and 1230 may be the same as the operations 1025 and 1030 shown in FIG. 6, respectively. For example, as shown in FIG. 11, the compressor 81 may be operated, the first outlet 83*b* may be opened, and the first fan 95 may be operated between time T1 and T3. Furthermore, the first outlet 83*b* of the switching valve 83 may be closed, the second outlet 83*c* may be opened, the first fan 95 may be stopped, and the second fan 96 may be rotated at time T3.

The refrigerator 1 may identify whether a seventh reference period of time has passed since the cooling of the first storage chamber 40 was stopped, in 1235. When the seventh reference period of time has passed since the refrigerant was stopped being supplied to the first evaporator 86 in 1235, the refrigerator 1 may defrost the first evaporator 86 in 1240.

The operations 1235 and 1240 may be the same as the operations 1035 and 1040 shown in FIG. 6, respectively. For example, as shown in FIG. 11, the first fan 95 may start to be rotated at time T4 to defrost the first evaporator 86, and the first fan 95 may be rotated between time T4 and T5.

The refrigerator 1 may identify whether the second measured temperature is lower than the second target temperature, in 1245. When the second measured temperature is lower than the second target temperature in 1245, the refrigerator 1 may stop cooling the second storage chamber 50 in 1250.

The operations 1245 and 1250 may be the same as the operations 1045 and 1050 shown in FIG. 6, respectively. For example, as shown in FIG. 11, the compressor 81 may be stopped, the switching valve 83 may be closed, and the second fan 96 may be stopped at time T6.

The refrigerator 1 may defrost the first evaporator 86 and the second evaporator 87, in 1255.

The operation 1255 may be the same as the operation 1055 of FIG. 6. For example, as shown in FIG. 11, the first fan 95 may be rotated between time T6 and time T7.

As described above, to maintain the difference in temperature between the first storage chamber 40 and the first isolated room 61, the refrigerator 1 may retrieve the remaining refrigerant in the evaporator and delay operation of the first fan 95 for defrosting operation of the first evaporator 86.

The operation 1200 of the refrigerator 1 as shown in FIG. 10 may skip delaying the operation of the first fan 95 for cooling operation of the first storage chamber 40 as compared to the operation 1100 of the refrigerator 1 as shown in FIG. 8. Hence, compared to the operation 1200 of the refrigerator 1, the operation 1100 of the refrigerator 1 may maintain a bigger difference in temperature between the first storage chamber 40 and the first isolated room 61.

The refrigerator 1 may perform one of the operation 1000, the operation 1100 and the operation 1200 based on the target temperature of the first storage chamber 40 input by the user.

Figure 12:
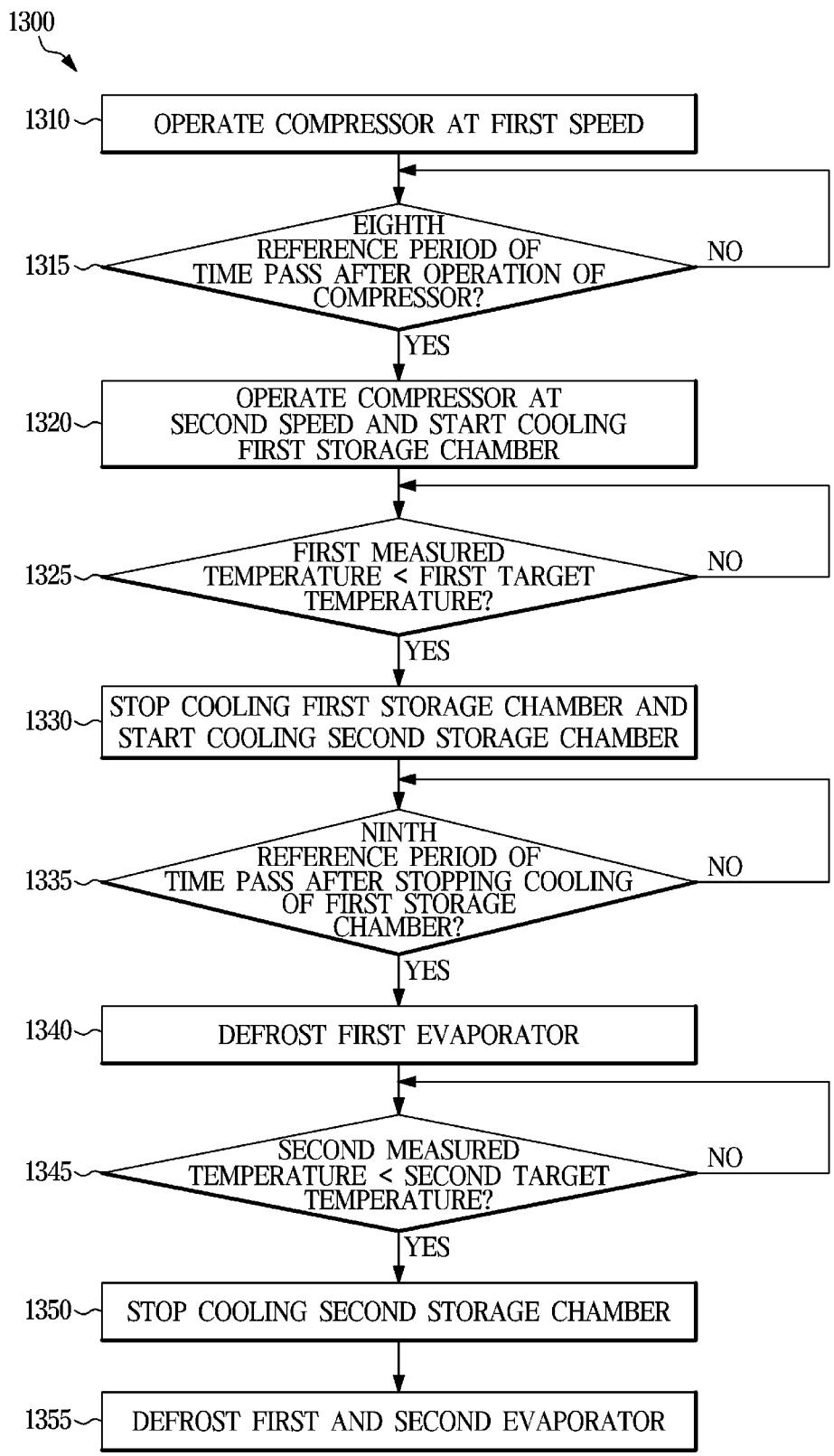
FIG. 12 illustrates an example of cooling/defrosting operation of a refrigerator, according to an embodiment.
Figure 13:
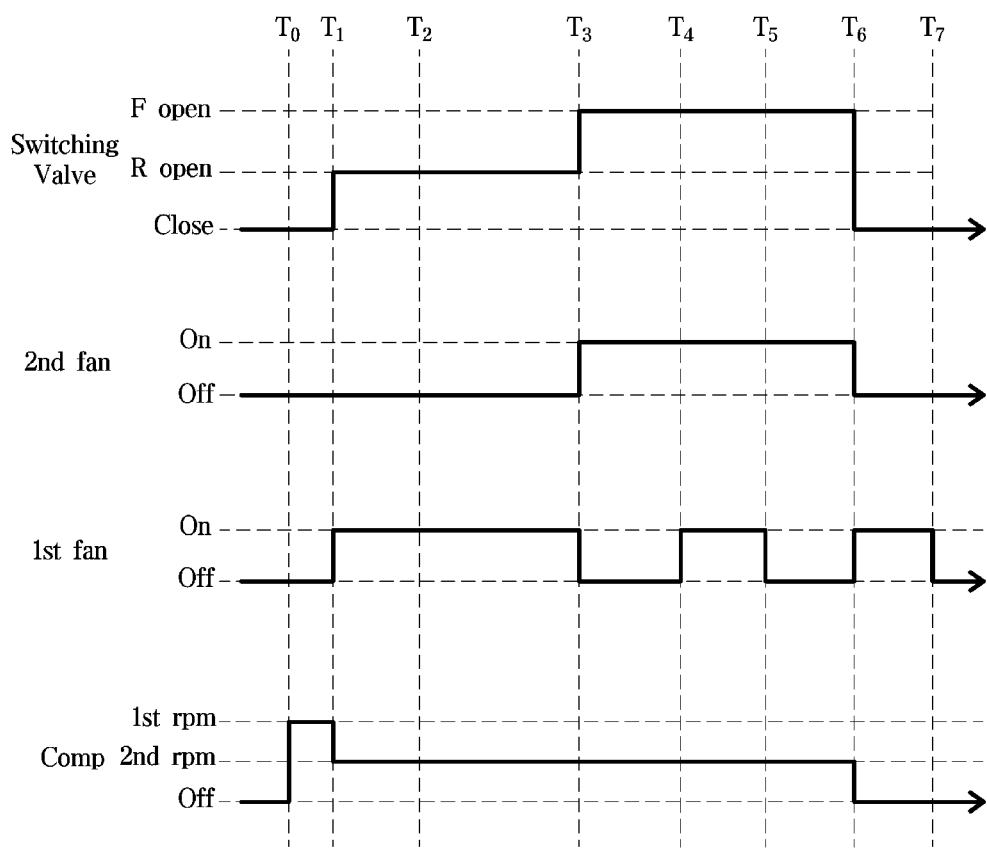
FIG. 13 illustrates an example of operations of a compressor, a first fan, a second fan, and a switching valve included in a refrigerator, according to an embodiment.

FIG. 12 illustrates an example of cooling/defrosting operation of a refrigerator, according to an embodiment. FIG. 13 illustrates an example of operations of a compressor, a first fan, a second fan, and a switching valve included in a refrigerator, according to an embodiment.

In connection with FIGS. 12 and 13, operation 1300 of the refrigerator 1 will be described.

The refrigerator 1 may operate the compressor 81 at first speed, in 1310.

The compressor 81 may include a motor and a compression tool, and the compression tool may compress the gaseous refrigerant and discharge the compressed refrigerant with the rotation of the motor.

In this case, the controller 190 may control the motor to be rotated at different speed. The higher the rotation speed of the motor, the more the amount of the compressed refrigerant discharged by the compressor 81, and the lower the rotation speed of the motor, the smaller the amount of the compressed refrigerant discharged by the compressor 81.

The controller 190 may control the motor to be rotated at the first speed, which may be higher than second speed which will be described later. For example, as shown in FIG. 13, the compressor 81 may be operated at the first speed at time T0.

As such, the controller 190 may operate the compressor 81 at relatively high speed (the first speed) while the switching valve 83 is closed. The compressor 81 operated at relatively high speed may quickly retrieve the refrigerant from the evaporator. With the compressor 81 operated at relatively high speed, as much refrigerant as to be suppled up to the rear end (the lower part) of the first evaporator 86 may be reserved. With the compressor 81 operated at relatively high speed, the remaining refrigerant liquid in the evaporator may be evaporated and the evaporator may be cooled in advance.

Accordingly, the difference in temperature between the first storage chamber 40 and the first isolated room 61 may be maintained as designed.

The refrigerator 1 may identify whether an eighth reference period of time has passed since the compressor 81 was operated, in 1315. When the eighth reference period of time has passed since the operation of the compressor 81 in 1315, the refrigerator 1 may operate the compressor 81 at second speed and cool the first storage chamber 40 in 1320.

For example, as shown in FIG. 13, the compressor 81 may be operated at high speed (the first speed) while the switching valve 83 is closed between time T0 and time T1.

Afterward, the controller 190 may reduce the rotation speed of the motor of the compressor 81 to the second speed based on the lapse of the eighth reference period of time after operation of the compressor 81. For example, as shown in FIG. 13, operation speed of the compressor 81 may be reduced at time T1. The second speed may be lower than the first speed, and may be a normal operation speed for cooling operation.

Furthermore, the controller 190 may control the switching valve 83 to open the first outlet 83*b* and rotate the first fan 95. For example, as shown in FIG. 13, the first outlet 83*b* may be opened and the first fan 95 may be rotated at time T1.

The refrigerator 1 may identify whether the first measured temperature is lower than the first target temperature, in 1325. When the first measured temperature is lower than the first target temperature in 1325, the refrigerator 1 may stop cooling the first storage chamber 40 and cool the second storage chamber 50 in 1330.

The operations 1325 and 1330 may be the same as the operations 1025 and 1030 shown in FIG. 6, respectively. For example, as shown in FIG. 13, the compressor 81 may be operated, the first outlet 83*b* may be opened, and the first fan 95 may be operated between time T1 and T3. Furthermore, the first outlet 83*b* of the switching valve 83 may be closed, the second outlet 83*c* may be opened, the first fan 95 may be stopped, and the second fan 96 may be rotated at time T3.

The refrigerator 1 may identify whether a ninth reference period of time has passed since the cooling of the first storage chamber 40 was stopped, in 1335. When the ninth reference period of time has passed since the refrigerant was stopped being supplied to the first evaporator 86 in 1335, the refrigerator 1 may defrost the first evaporator 86 in 1340.

The operations 1335 and 1340 may be the same as the operations 1035 and 1040 shown in FIG. 6, respectively. For example, as shown in FIG. 13, the first fan 95 may start to be rotated at time T4 to defrost the first evaporator 86, and the first fan 95 may be rotated between time T4 and T5.

The refrigerator 1 may identify whether the second measured temperature is lower than the second target temperature, in 1345. When the second measured temperature is lower than the second target temperature in 1345, the refrigerator 1 may stop cooling the second storage chamber 50 in 1350.

The operations 1345 and 1350 may be the same as the operations 1045 and 1050 shown in FIG. 6, respectively. For example, as shown in FIG. 13, the compressor 81 may be stopped, the switching valve 83 may be closed, and the second fan 96 may be stopped at time T6.

The refrigerator 1 may defrost the first evaporator 86 and the second evaporator 87, in 1355.

The operation 1355 may be the same as the operation 1055 of FIG. 6. For example, as shown in FIG. 13, the first fan 95 may be rotated between time T6 and time T7.

As described above, to maintain the difference in temperature between the first storage chamber 40 and the first isolated room 61, the refrigerator 1 may retrieve the remaining refrigerant in the evaporator and delay operation of the first fan 95 for defrosting operation of the first evaporator 86.

Especially, the refrigerator 1 may operate the compressor 81 at high speed to retrieve the remaining refrigerant in the evaporator. The evaporator may be cooled while the switching valve 83 is closed and the compressor 81 is operated. Hence, compared to the operation 1200 of the refrigerator 1, the operation 1300 of the refrigerator 1 may maintain a bigger difference in temperature between the first storage chamber 40 and the first isolated room 61.

The refrigerator 1 may perform one of the operation 1000, the operation 1100, the operation 1200 and the operation 1300 based on the target temperature of the first storage chamber 40 input by the user.

Figure 14:
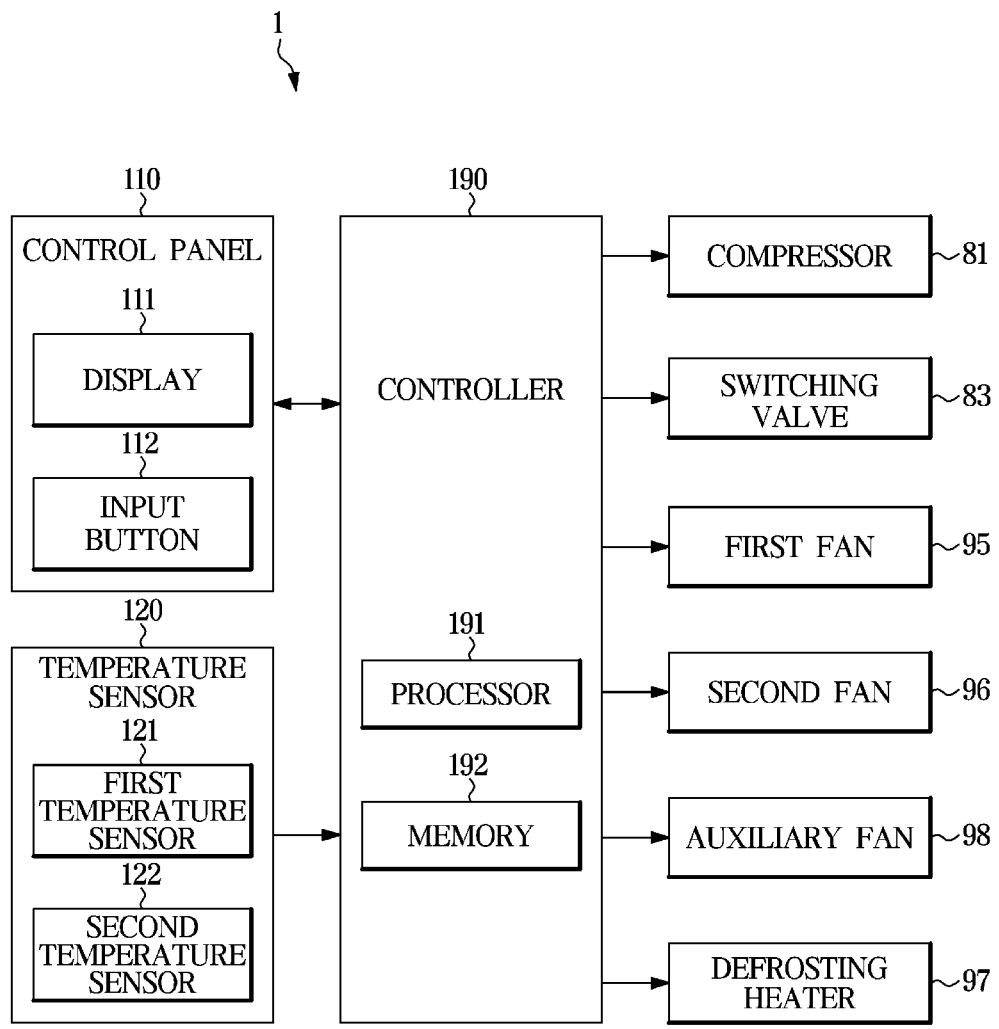
FIG. 14 is a block diagram of a refrigerator, according to an embodiment.
Figure 15:
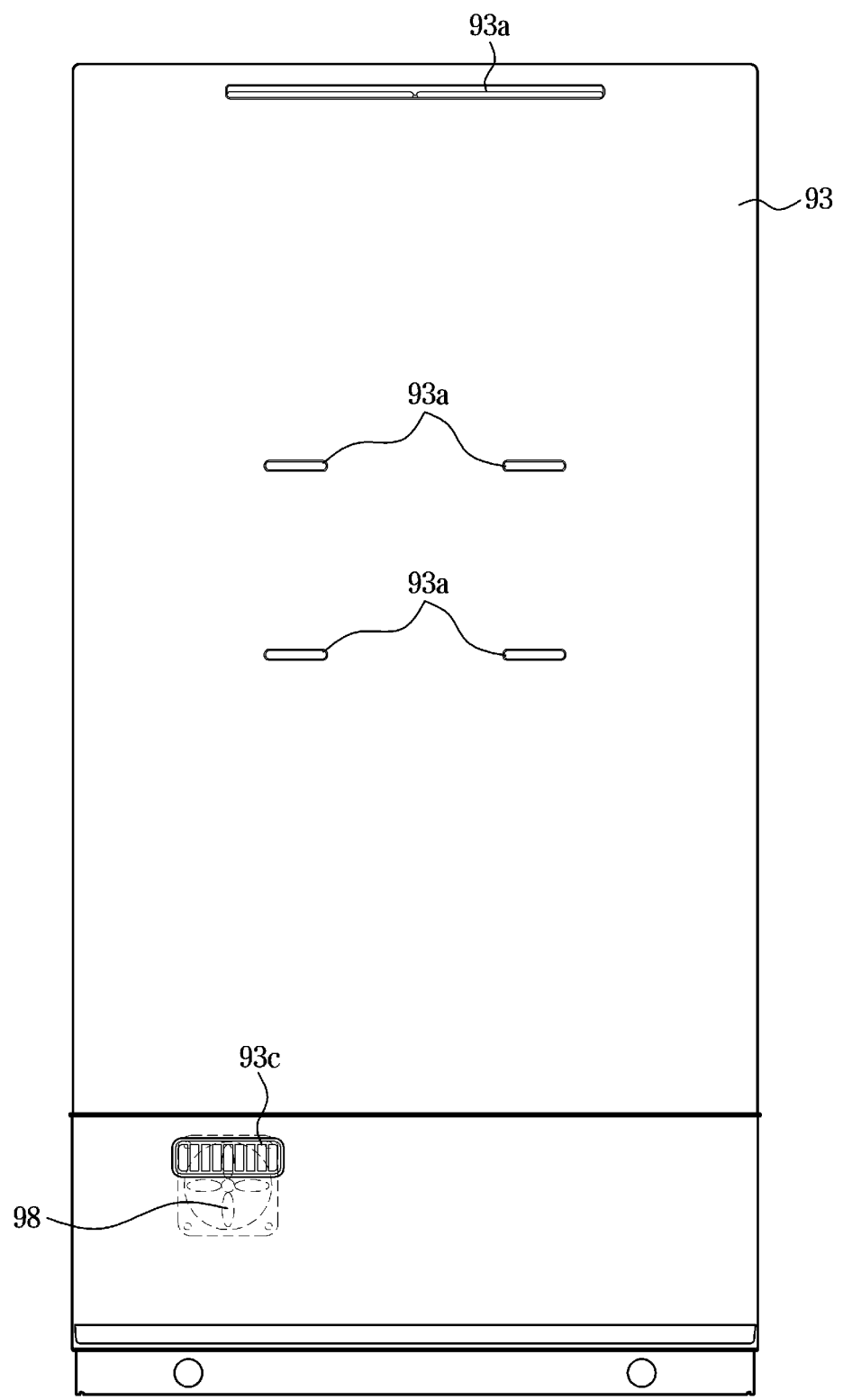
FIG. 15 illustrates a first rear panel and a first evaporator included in a refrigerator, according to an embodiment.

FIG. 14 is a block diagram of a refrigerator, according to an embodiment. FIG. 15 illustrates a first rear panel and a first evaporator included in a refrigerator, according to an embodiment.

Referring to FIGS. 14 and 15, the refrigerator 1 may include the control panel 110, the temperature sensor 120, the compressor 81, the switching valve 83, the first fan 95, the second fan 96, the defrosting heater 97, an auxiliary fan 98 or the controller 190.

The control panel 110, the temperature sensor 120, the compressor 81, the switching valve 83, the first fan 95, the second fan 96 and the defrosting heater 97 may be the same as the control panel, the temperature sensor, the compressor, the switching valve, the first fan, the second fan and the defrosting heater as shown in FIG. 5.

The auxiliary fan 98 may be rotated in response to a control signal from the controller 190.

The auxiliary fan 98 may be installed in the auxiliary outlet 93c as shown in FIG. 15. The auxiliary fan 98 may discharge the air of the first cooling duct 91 to the first isolated room 61 of the first container 60 through the auxiliary outlet 93c.

Air of the first cooling duct 91 having a flow rate defined by the auxiliary fan 98 may be supplied to the first isolated room 61. Hence, the refrigerator 1 may actively control the temperature of the first isolated room 61 as well as the temperature of the first storage chamber 40.

The position of the auxiliary fan 98 is not, however, limited to what is shown in FIG. 15. For example, the auxiliary outlet 93c may be arranged on the right from the center of the first rear panel 93, and the auxiliary fan 98 may be arranged on the right side from the center of the first rear panel 93 along with the auxiliary outlet 93c.

The auxiliary fan 98 may include a motor and fan wings, and the fan wings rotated with the rotation of the motor may create a flow of air.

Furthermore, a damper for opening or closing the auxiliary outlet 93c may be optionally installed in the auxiliary outlet 93c.

The controller 190 may rotate the auxiliary fan 98 to provide cooled air to the first isolated room 61 during the cooling operation.

Figure 16:
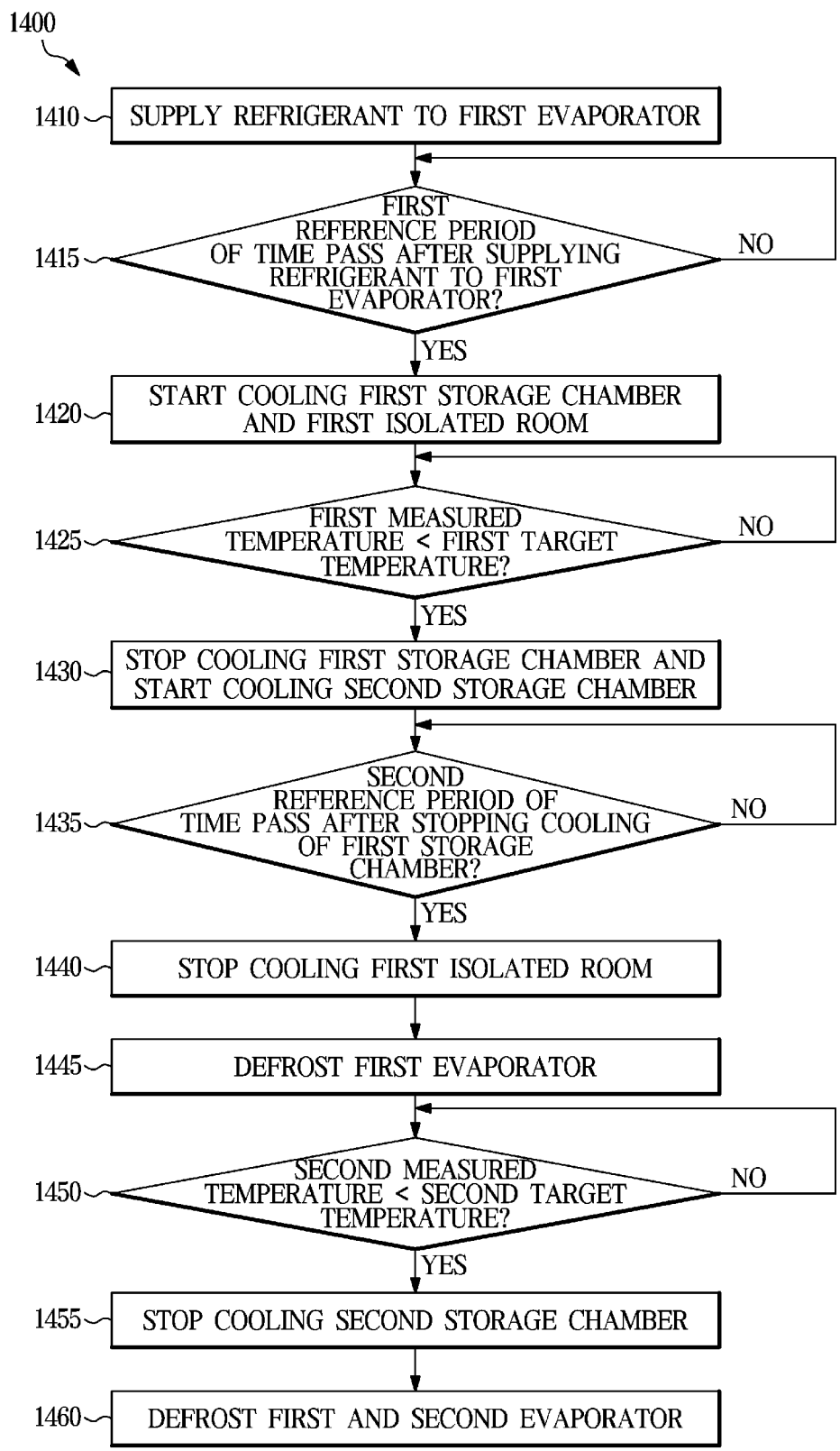
FIG. 16 illustrates an example of cooling/defrosting operation of a refrigerator, according to an embodiment.
Figure 17:
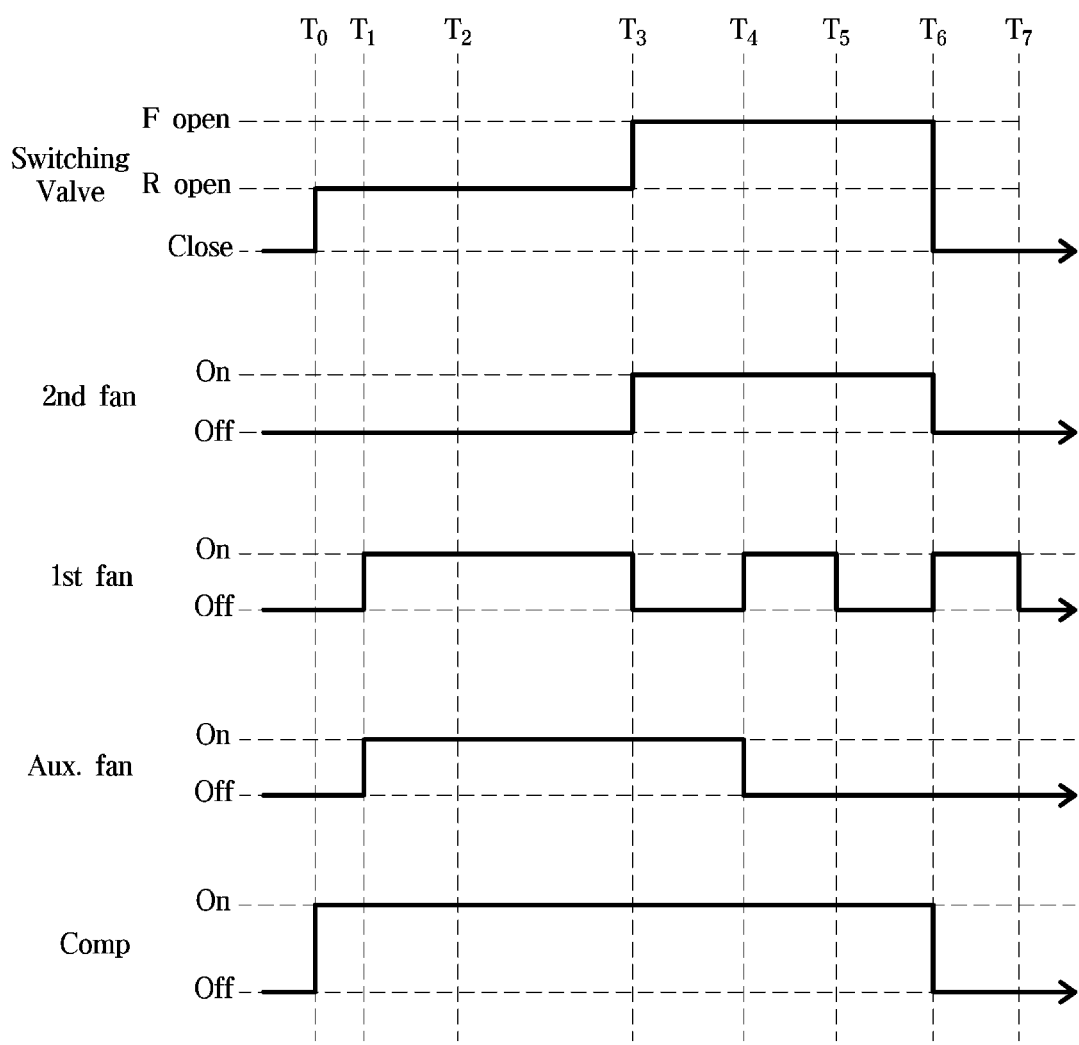
FIG. 17 illustrates an example of operations of a compressor, a first fan, a second fan, and a switching valve included in a refrigerator, according to an embodiment.

FIG. 16 illustrates an example of cooling/defrosting operation of a refrigerator, according to an embodiment. FIG. 17 illustrates an example of operations of a compressor, a first fan, a second fan, and a switching valve included in a refrigerator, according to an embodiment.

In connection with FIGS. 16 and 17, operation 1400 of the refrigerator 1 will be described.

The refrigerator 1 may supply the refrigerant to the first evaporator 86, in 1410.

The operation 1410 may be the same as the operation 1010 of FIG. 6. For example, as shown in FIG. 17, the compressor 81 may be operated and the first outlet 83b of the switching valve 83 may be opened at time TO.

The refrigerator 1 may identify whether a first reference period of time has passed after the refrigerant is supplied to the first evaporator 86 in 1415. When the first reference period of time passes after the refrigerant is supplied to the first evaporator 86 in 1415, the refrigerator 1 may cool the first storage chamber 40 and the first isolated room 61, in 1420.

The controller 190 may rotate the first fan 95 and the auxiliary fan 98 based on a time that has passed since the compressor 81 was operated and the first outlet 83b was opened being equal to or greater than the first reference period of time. For example, as shown in FIG. 17, the first fan 95 and the auxiliary fan 98 may be rotated at time T1.

The controller 190 may supply the refrigerant to the first evaporator 86 without movement of air for the first reference period of time, and after the lapse of the first reference period of time, supply the air cooled by the first evaporator to the first storage chamber 40 and the first isolated room 61.

A preset amount of the air of the first cooling duct 91 may be supplied to the first storage chamber 40 according to the rotation of the first fan 95. Furthermore, a preset amount of the air of the first cooling duct 91 may also be supplied to the first isolated room 61 according to the rotation of the auxiliary fan 98.

As such, the controller 190 may control the temperature of the first isolated room 61 separately from the temperature of the first storage chamber 40 by controlling rotation of the auxiliary fan 98. Furthermore, the difference in temperature between the first storage chamber 40 and the first isolated room 61 may be maintained.

The refrigerator 1 may identify whether the first measured temperature is lower than the first target temperature in 1425. When the first measured temperature is lower than the first target temperature in 1425, the refrigerator 1 may stop cooling the first storage chamber 40 and cool the second storage chamber 50 in 1430.

The operations 1425 and 1430 may be the same as the operations 1025 and 1030 shown in FIG. 6, respectively. For example, as shown in FIG. 17, the compressor 81 may be operated, the first outlet 83b may be opened, and the first fan 95 may be operated between time T2 and T3. Furthermore, the first outlet 83b of the switching valve 83 may be closed, the second outlet 83c may be opened, the first fan 95 may be stopped, and the second fan 96 may be rotated at time T3. In this case, the first auxiliary fan 98 may continue to be rotated.

The refrigerator 1 may identify whether a second reference period of time has passed after the cooling of the first storage chamber 40 is stopped, in 1145. When the fifth reference period of time has passed since the refrigerant was stopped being supplied to the first evaporator 86 in 1145, the refrigerator 1 may stop cooling the first isolated room 61 and defrost the first evaporator 86 in 1150.

The controller 190 may stop rotating the auxiliary fan 98 based on a time having passed since the cooling of the first storage chamber 40 was stopped being equal to or greater than the second reference period of time. For example, as shown in FIG. 17, the auxiliary fan 98 may be rotated between time T1 and T4, and the rotation of the auxiliary fan 98 may be stopped at time T4.

In other words, the controller 190 may rotate the auxiliary fan 98 for the second reference period of time after stopping supplying the refrigerant to the first evaporator 86. Hence, the air cooled by the cooled first evaporator 86 may be supplied to the first isolated room 61 by the auxiliary fan 98. Furthermore, without air blending between the first storage chamber 40 and the first isolated room 61, the difference in temperature between the first storage chamber 40 and the first isolated room 61 may be maintained.

Furthermore, the controller 190 may rotate the first fan 95 for the first defrosting period of time to defrost the first evaporator 86 based on a time having passed since the cooling of the first storage chamber 40 was stopped being equal to or greater than the second reference period of time. For example, as shown in FIG. 17, the first fan 95 may start to be rotated at time T4, and the first fan 95 may be rotated between time T4 and time T5.

The refrigerator 1 may identify whether the second measured temperature is lower than the second target temperature in 1445. When the second measured temperature is lower than the second target temperature in 1445, the refrigerator 1 may stop cooling the second storage chamber 50 in 1450.

The operations 1445 and 1450 may be the same as the operations 1145 and 1150 shown in FIG. 6, respectively. For example, as shown in FIG. 17, the compressor 81 may be stopped, the switching valve 83 may be closed, and the second fan 96 may be stopped at time T6.

The refrigerator 1 may defrost the first evaporator 86 and the second evaporator 87, in 1455.

The operation 1455 may be the same as the operation 1055 of FIG. 6. For example, as shown in FIG. 17, the first fan 95 may be rotated between time T6 and time T7.

As described above, the auxiliary outlet 93c may be equipped with the auxiliary fan 98 for supplying cooled air to the first isolated room 61. Hence, the refrigerator 1 may control the temperature of the first isolated room 61 separately from the temperature of the first storage chamber 40. Furthermore, the refrigerator 1 may maintain a big difference in temperature between the first storage chamber 40 and the first isolated room 61.

A refrigerator may include a storage chamber maintained at a temperature above zero; an evaporator arranged in a duct fluidly connected to the storage chamber; a compressor; a valve arranged in a flow path which connects the compressor to the evaporator; a first fan configured to supply air cooled by the evaporator to the storage chamber; and a controller configured to control at least one of the compressor or the valve to supply a refrigerant to the evaporator based on the temperature of the storage chamber, and delay operation of the first fan for a first reference period of time after supplying the refrigerant to the evaporator.

The controller may rotate the first fan based on the lapse of the first reference period of time after supplying the refrigerant to the evaporator.

As such, the refrigerator may supply the refrigerant to the evaporator without a flow of air around the evaporator. Hence, the evaporator may be cooled and the refrigerant in the entire evaporator may be evaporated. In other words, the entire evaporator may be cooled by evaporation of the refrigerant.

As a result, the cooled air may be supplied into multiple sections partitioned from the storage chamber, and temperature distinction between the multiple sections may be maintained.

The controller may control at least one of the compressor or the valve to stop supplying the refrigerant to the evaporator based on the temperature of the storage chamber, and stop the first fan based on the stopping of supplying the refrigerant to the evaporator.

Furthermore, the controller may rotate the first fan without supplying the refrigerant to the evaporator based on the lapse of a preset second reference period of time after stopping of supplying the refrigerant to the evaporator.

As such, the refrigerator may rotate the fan to defrost the evaporator after stopping supplying the refrigerant to the evaporator. Furthermore, the refrigerator may delay fan-based defrosting of the evaporator for the second reference period of time. Accordingly, the defrosting of the evaporator may prevent or suppress blending of air of the multiple sections partitioned from the storage chamber and reduction in temperature difference between the multiple sections.

The controller may operate the compressor while closing the valve for a third reference period of time, and open the valve based on the lapse of the third reference period of time after the operation of the compressor.

As such, the refrigerator may operate the compressor while closing the valve, thereby retrieving the refrigerant of the evaporator. Hence, cooling efficiency may be improved according to the refrigerant circulation, and cooling of the evaporator may be facilitated by the supply of the refrigerant.

The controller may operate the compressor at a first speed for the first reference period of time, and operate the compressor at a second speed lower than the first speed based on the lapse of the first reference period of time after operating the compressor at the first speed.

As such, the refrigerator may operate the compressor at high speed while retrieving the refrigerant. Accordingly, cooling of the evaporator may further be facilitated by the supply of the refrigerant.

The refrigerator may further include a panel that separates the storage chamber from the duct, the storage chamber may include a fridge and an isolated room, and the panel may have a first opening connecting the duct to the fridge and a second opening connecting the duct to the isolated room. The second opening may be arranged at a position corresponding to a bottom portion of the evaporator, and the second opening may be spaced apart from a vertical center line of the panel. A center line of the bottom portion of the evaporator may be spaced apart from the vertical center line of the evaporator toward the second opening. The refrigerant may flow in through the top end of the evaporator and flow out through the bottom end of the evaporator. The refrigerator may further include a second fan configured to supply air cooled by the evaporator into the isolated room.

The controller may rotate the second fan based on the lapse of the first reference period of time after supplying the refrigerant to the evaporator. The controller may control at least one of the compressor or the valve to stop supplying the refrigerant to the evaporator based on the temperature of the storage chamber, stop the first fan based on the stopping of supplying the refrigerant to the evaporator, and stop the second fan based on the lapse of the preset second reference period of time after the stopping of supplying the refrigerant to the evaporator.

As such, the refrigerator may include the fridge and the isolated room, and further include the second fan for supplying cooled air to the isolated room.

With the second fan, the refrigerator may separately control the temperature of the isolated room from the temperature of the fridge, and maintain the difference in temperature between the fridge and the isolated room.

The disclosed embodiments may be implemented in the form of a recording medium for storing instructions to be carried out by a computer. The instructions may be stored in the form of program codes, and when executed by a processor, may generate program modules to perform operation in the disclosed embodiments. The recording media may correspond to computer-readable recording media.

The computer-readable recording medium includes any type of recording medium having data stored thereon that may be thereafter read by a computer. For example, it may be a read only memory (ROM), a random access memory (RAM), a magnetic tape, a magnetic disk, a flash memory, an optical data storage device.

The machine-readable storage medium may be provided in the form of a non-transitory storage medium. The term 'non-transitory storage medium' may mean a tangible device without including a signal, e.g., electromagnetic waves, and may not distinguish between storing data in the storage medium semi-permanently and temporarily. For example, the non-transitory storage medium may include a buffer that temporarily stores data.

The aforementioned method according to the various embodiments may be provided in a computer program product. The computer program product may be a commercial product that may be traded between a seller and a buyer. The computer program product may be distributed in the form of a storage medium (e.g., a compact disc read only memory (CD-ROM)), through an application store (e.g., Play Store™), directly between two user devices (e.g., smart phones), or online (e.g., downloaded or uploaded). In the case of online distribution, at least part of the computer program product (e.g., a downloadable app) may be at least temporarily stored or arbitrarily created in a storage medium that may be readable to a device such as a server of the manufacturer, a server of the application store, or a relay server.

The embodiments have thus far been described with reference to accompanying drawings. It will be obvious to people of ordinary skill in the art that the disclosed embodiments may be practiced in other forms than the embodiments as described above without changing the technical idea or essential features. The above embodiments are only by way of example, and should not be interpreted in a limited sense.

The invention claimed is:

1. A refrigerator comprising:
a storage chamber configured to be maintained at a temperature above zero degrees Celsius, and comprising an isolated room and a main room, wherein the isolated room is configured to be maintained at a lower temperature than the main room;
an evaporator disposed in a duct that is fluidly connected to the storage chamber;
a panel configured to separate the storage chamber and the duct, and comprising a first outlet for discharging air into the main room and an auxiliary outlet for discharging air into the isolated room;
a compressor;
a valve disposed in a flow path which connects the compressor to the evaporator;
a first fan configured to drive air that is cooled by the evaporator to the storage chamber; and
a controller configured to:
control at least one of the compressor or the valve to supply a refrigerant to the evaporator based on a temperature of the storage chamber, and
delay operation of the first fan for a preset first reference period of time after the at least one of the compressor or the valve began supplying the refrigerant to the evaporator,
wherein the refrigerant supplied to the evaporator flows in through a top end of the evaporator and flows out through a bottom end of the evaporator,
wherein the first outlet is formed in an upper portion of the panel and the auxiliary outlet is formed in a lower portion of the panel, and
wherein the preset first reference period of time is set to a time for which to an entirety of the evaporator is cooled and evaporation of the refrigerant occurs in the entirety of the evaporator.

2. The refrigerator of claim 1, wherein the controller is further configured to drive the first fan based on the preset first reference period of time having elapsed since the at least one of the compressor or the valve began supplying the refrigerant to the evaporator.

3. The refrigerator of claim 1, wherein the controller is further configured to
control the at least one of the compressor or the valve to stop supplying the refrigerant to the evaporator based on the temperature of the storage chamber, and
stop the first fan based on the at least one of the compressor or the valve stopping of supplying the refrigerant to the evaporator.

4. The refrigerator of claim 3, wherein the controller is further configured to rotate the first fan without supplying the refrigerant to the evaporator based on a preset second reference period of time having elapsed after the at least one of the compressor or the valve stopping of supplying the refrigerant to the evaporator.

5. The refrigerator of claim 1, wherein the controller is further configured to
operate the compressor with the valve closed for a preset third reference period of time, and
open the valve based on the third reference period of time having elapsed since the operation of the compressor began.

6. The refrigerator of claim 1, wherein the controller is further configured to
operate the compressor at a first speed for the preset first reference period of time, and
operate the compressor at a second speed based on the preset first reference period of time having elapsed since the operation of the compressor at the first speed began, the second speed being lower than the first speed.

7. The refrigerator of claim 1,
wherein the auxiliary outlet is spaced apart from a vertical center line of the panel.

8. The refrigerator of claim 7, wherein a center line of a bottom portion of the evaporator is spaced apart from a vertical center line of the evaporator toward the auxiliary outlet.

9. The refrigerator of claim 1, further comprising:
an auxiliary fan configured to drive the air that is cooled by the evaporator into the isolated room.

10. The refrigerator of claim 9, wherein the controller is further configured to drive the auxiliary fan after the preset first reference period of time having elapsed since the at least one of the compressor or the valve began supplying the refrigerant to the evaporator.

11. The refrigerator of claim 9, wherein the controller is further configured to
control the at least one of the compressor or the valve to stop supplying the refrigerant to the evaporator based on the temperature of the storage chamber,
stop the first fan based on the at least one of the compressor or the valve stopping of supplying the refrigerant to the evaporator, and
stop the auxiliary fan based on a preset second reference period of time after the at least one of the compressor or the valve stopping of supplying the refrigerant to the evaporator.

12. A method of controlling a refrigerator comprising a storage chamber, an evaporator disposed in a duct that is fluidly connected to the storage chamber, a compressor, a valve disposed in a flow path which connects the compressor to the evaporator, a first fan configured to drive air that is cooled by the evaporator to the storage chamber, the method comprising:
controlling at least one of the compressor or the valve to supply a refrigerant to the evaporator that is disposed in the duct that is fluidly connected to the storage chamber that is maintained at a temperature above zero degrees Celsius based on a temperature of the storage chamber, the compressor being disposed in the flow path which connects the compressor to the evaporator; and delaying operation of the first fan that is configured to supply the air that is cooled by the evaporator to the storage chamber for a preset first reference period of time since the at least one of the compressor or the valve began supplying the refrigerant to the evaporator, wherein the storage chamber comprises an isolated room and a main room, wherein the isolated room is configured to be maintained at a lower temperature than the main room, wherein the refrigerator further comprises a panel configured to separate the storage chamber and the duct, the panel comprising a first outlet for discharging air into the main room and an auxiliary outlet for discharging air into the isolated room, wherein the refrigerant supplied to the evaporator flows in through a top end of the evaporator and flows out through a bottom end of the evaporator, wherein the first outlet is formed in an upper portion of the panel and the auxiliary outlet is formed in a lower portion of the panel, and wherein the preset first reference period of time is set to a time for which to an entirety of the evaporator is cooled and evaporation of the refrigerant occurs in the entirety of the evaporator.

13. The method of claim 12, further comprising:
driving the first fan based on the first reference period of time having elapsed since the at least one of the compressor or the valve began supplying the refrigerant to the evaporator.

14. The method of claim 12, wherein the refrigerator further comprises an auxiliary fan, and
wherein the auxiliary fan is configured to drive the air that is cooled by the evaporator into the isolated room.

15. The method of claim 14, further comprising:
driving the auxiliary fan after the preset first reference period of time has elapsed since the at least one of the compressor or the valve began supplying the refrigerant to the evaporator.

16. The method of claim 14, further comprising:
controlling the at least one of the compressor or the valve to stop supplying the refrigerant to the evaporator based on the temperature of the storage chamber,
stopping the first fan based on the at least one of the compressor or the valve stopping of supplying the refrigerant to the evaporator, and
stopping the auxiliary fan based on a preset second reference period of time after the at least one of the compressor or the valve stopping of supplying the refrigerant to the evaporator.

17. A non-transitory storage medium for storing instructions of a method to be carried out by a controller of a refrigerator including a storage chamber, an evaporator disposed in a duct that is fluidly connected to the storage chamber, a compressor, a valve disposed in a flow path which connects the compressor to the evaporator, a first fan configured to drive air that is cooled by the evaporator to the storage chamber, the method comprising:

controlling at least one of the compressor or the valve to supply a refrigerant to the evaporator that is disposed in the duct that is fluidly connected to the storage chamber that is maintained at a temperature above zero degrees Celsius based on a temperature of the storage chamber, the compressor being disposed in the flow path which connects the compressor to the evaporator; and delaying operation of the first fan that is configured to supply air that is cooled by the evaporator to the storage chamber for a preset first reference period of time since the at least one of the compressor or the valve began supplying the refrigerant to the evaporator, wherein the storage chamber comprises an isolated room and a main room, wherein the isolated room is configured to be maintained at a lower temperature than the main room, wherein the refrigerator further comprises a panel configured to separate the storage chamber and the duct, the panel comprising a first outlet for discharging air into the main room and an auxiliary outlet for discharging air into the isolated room, wherein the refrigerant supplied to the evaporator flows in through a top end of the evaporator and flows out through a bottom end of the evaporator, wherein the first outlet is formed in an upper portion of the panel and the auxiliary outlet is formed in a lower portion of the panel, and wherein the preset first reference period of time is set to a time for which to an entirety of the evaporator is cooled and evaporation of the refrigerant occurs in the entirety of the evaporator.

* * * * *